(12) United States Patent
Watanabe et al.

(10) Patent No.: US 6,476,897 B1
(45) Date of Patent: Nov. 5, 2002

(54) MATRIX SUBSTRATE AND LIQUID CRYSTAL DISPLAY DEVICE AND PROJECTION LIQUID CRYSTAL DISPLAY DEVICE USING THE SAME

(75) Inventors: Takanori Watanabe, Atsugi; Katsumi Kurematsu, Hiratsuka; Osamu Koyama, Hachioji, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/176,331

(22) Filed: Oct. 22, 1998

(30) Foreign Application Priority Data

Oct. 24, 1997 (JP) ............................................... 9-292465

(51) Int. Cl.[7] ............................................... G02F 1/1343
(52) U.S. Cl. ........................................ 349/139; 349/143
(58) Field of Search .............................. 349/42, 43, 113, 349/143, 139

(56) References Cited

U.S. PATENT DOCUMENTS 5,796,380 A    8/1998  Kurematsu .................... 345/96
5,815,223 A    9/1998  Watanabe et al. ............. 349/42
5,816,677 A   10/1998  Kurematsu et al. ........... 362/31
6,166,792 A  * 12/2000 Miyawaki et al. ........... 349/113

FOREIGN PATENT DOCUMENTS

JP            09-073103          3/1997

\* cited by examiner

*Primary Examiner*—William L. Sikes
*Assistant Examiner*—Dung Nguyen
(74) *Attorney, Agent, or Firm*—Fitzpatrick, Cella, Harper & Scinto

(57) ABSTRACT

A matrix substrate includes a plurality of pixel electrodes arranged in a matrix, and a driving circuit region and a sealing region provided in the peripheral region of the plurality of pixel electrodes, a sealant, a spacer material and a liquid crystal material being disposed between the plurality of pixel electrodes and a counter substrate to constitute a liquid crystal display device. A first conductive layer is provided under the plurality of pixel electrodes, a second conductive layer is provided under the sealing region for arranging the sealant and the spacer material, and the first conductive layer is electrically separated from the second conductive layer.

11 Claims, 28 Drawing Sheets

1342: SPECTRAL REFLECTANCE OF B-REFLECTING DICHROIC MIRROR

1341: SPECTRAL REFLECTANCE OF B/G-REFLECTING DICHROIC MIRROR

1340: SPECTRAL REFLECTANCE OF R-REFLECTING DICHROIC MIRROR

IMAGE/CONTROL SIGNALS

AN RGB MIXED COLOR

| R | G | B | R | G | B | R | G | B | R | G | B |
|---|---|---|---|---|---|---|---|---|---|---|---|
| R | G | B | R | G | B | R | G | B | R | G | B |
| R | G | B | R | G | B | R | G | B | R | G | B |
| R | G | B | R | G | B | R | G | B | R | G | B |
| R | G | B | R | G | B | R | G | B | R | G | B |

MATRIX SUBSTRATE AND LIQUID CRYSTAL DISPLAY DEVICE AND PROJECTION LIQUID CRYSTAL DISPLAY DEVICE USING THE SAME

BACKGROUND OF THE INVENTION

1. Field of the Invention

The present invention relates to matrix substrates used in liquid crystal devices, and relates to liquid crystal display devices and projection liquid crystal display devices using the matrix substrates.

2. Description of the Related Art

Recent progress in information networks has increased the need for display devices for communication of information, particularly image information. Liquid crystal display devices, which are thin and have an advantage in low electrical power consumption, have attracted considerable attention and are growing as one of the basic industries, similarly to the semiconductor industries. Recently, liquid crystal display devices have mainly been used in 12" notebook personal computers. In the future, liquid crystal display devices having larger screen sizes will be used in workstations and home televisions, as well as in personal computers. The trends toward increasing scale in liquid crystal display devices, however, demands the introduction of expensive apparatuses for producing such devices. Further, large scale liquid crystal display devices must have extreme electrical characteristics for driving large screens. Thus, production costs increase significantly, that is, in proportion to from the square to the cube of the screen size.

A front- or back-projection system using a small-size liquid crystal display panel recently has attracted attention in which a liquid crystal image is optically enlarged and displayed. Performance and production costs of liquid crystal display devices are improved with size reduction in the devices by the scaling rule as in semiconductors. In TFT liquid crystal display panels, TFTs using polycrystalline Si are being substituted for those using amorphous Si to meet the requirement of small-size TFTs having high driving force. Image signals having a resolution level in the NTSC standard do not require high-speed processing.

A possible TFT liquid crystal display device which can be used to meet such requirements has an integrated structure including a display region and peripheral driving circuits, such as a shift register and a decoder, which are also formed of polycrystalline Si. Polycrystalline Si, however, is not comparable to single crystal Si. When a display of an extended graphics array (XGA) or super extended graphics array (SXGA) class in the resolution standard of computers is designed, for example, the shift register must inevitably be divided into a plurality of segments. Signal noise (ghosting) will occur in the display region corresponding to the boundary between the segments. Countermeasures are required for solving such problems.

Japanese Patent Laid-Open No. 9-73103 discloses a reflection-type liquid crystal device using polycrystalline Si and single crystal Si for solving the degradation problem of the displayed image by a decreased contrast which is caused by reduced reflectance of light because of scattering of light incident on the pixel electrode having surface unevenness in all directions, and insufficient alignment of the alignment film in the rubbing step in the liquid crystal mounting process and thus unsatisfactory alignment of the liquid crystal.

Japanese Patent Laid-Open No. 9-73103 discloses pixel electrodes having smooth surfaces formed by chemical/mechanical polishing (hereinafter referred to as CMP). Each of the resulting pixel electrodes has a mirror surface and all the pixel electrodes lie in the same plane. The smooth surface permits display of high quality images free of random scattering of incident light and insufficient alignment of liquid crystals.

A method for making an active matrix substrate disclosed in Japanese Patent Laid-Open No. 9-73103 will be described with reference to FIGS. 30A to 30H. FIGS. 30A to 30H describe a pixel section. Peripheral circuits such as a shift register for driving a switching transistor in the pixel section can also be simultaneously formed during the formation of the pixel section on the same substrate.

An n-type silicon semiconductor substrate 201 having an impurity concentration of $10^{15}$ cm$^{-3}$ or less is subjected to local thermal oxidation to form a LOCOS (local oxidation of silicon) layer 202, and boron ions are implanted in a dose of approximately $10^{12}$ cm$^{-2}$ through the LOCOS layer 202 as a mask to form a p-type well (PWL) 203 being a p-type impurity region having an impurity concentration of $10^{16}$ cm$^{-3}$. The substrate 201 is thermally oxidized to form a gate oxide film 204 having a thickness of 1,000 angstroms or less (FIG. 30A).

An n-type polysilicon gate electrode 205 is formed by doping phosphorus in an amount of approximately $10^{20}$ cm$^{-3}$, phosphorus ions are implanted onto the entire surface of the substrate 201 in a dose of approximately $10^{12}$ cm$^{-2}$ to form an n-type lightly doped drain (NLD) 206 being an n-type impurity region having an impurity concentration of $10^{16}$ cm$^{-3}$. Phosphorus ions are implanted through a patterned photoresist mask in a dose of approximately $10^{15}$ cm$^{-2}$ to form source and drain regions 207 and 207' having an impurity concentration of approximately $10^{19}$ cm$^{-3}$ (FIG. 30B).

A phospho-silicate glass (PSG) 208, which is a phosphorus-doped oxide film, is formed as an interlayer on the entire substrate 201. The PSG film 208 can be replaced with a nondoped silicate glass (NSG)/boro-phospho-silicate glass (BPSG) film or a tetraethoxysilane (TEOS) film. Contact holes are patterned into the PSG film 208 just above the source and drain regions 207 and 207'. Aluminum is deposited by a sputtering process and then patterned to form an aluminum electrode 209 (FIG. 30C). It is preferred that a barrier metal composed of Ti or TiN be formed between the aluminum electrode 209 and the source and drain regions 207 and 207' so as to improve the ohmic contact characteristics between the aluminum electrode 209 and the source and drain regions 207 and 207'.

A plasma SiN film 210 with a thickness of approximately 3,000 angstroms, and then a PSG film 211 with a thickness of approximately 10,000 angstroms are formed on the entire substrate 201 (FIG. 30D). The PSG film 211 is patterned using the plasma SiN film 210 as a dry etching stopper layer so as to leave the separation region between pixels, and then a through hole 212 is patterned just above the aluminum electrode 208 which is in contact with the drain region 207' by dry etching (FIG. 30E).

A pixel electrode 213 with a thickness of approximately 10,000 angstroms or more is formed on the substrate 201 by sputtering or electron beam (EB) deposition (FIG. 30F). The pixel electrode 213 is composed of a metal film of Al, Ti, Ta or W, or a metal compound film of such a metal. The surface of the pixel electrode 213 is polished by CMP (FIG. 30G).

An alignment film 215 is formed on the resulting active matrix substrate, and its surface is subjected to alignment treatment such as rubbing. The substrate is bonded with a counter substrate with a spacer (not shown in the drawing) therebetween, and a liquid crystal 214 is injected into the gap to form a liquid crystal device (FIG. 30H). The counter electrode includes a transparent substrate 220, a color filter 221, a black matrix 222, a common electrode of ITO 223, and an alignment film 215, in that order.

The reflection-type liquid crystal device is driven as follows. Peripheral circuits including a shift register which is formed on the substrate 201 by an on-chip process applies a signal potential to the source region 207 and a gate potential to the gate electrode 205 such that the switching transistor in the pixel in an ON state supplies signal charge to the drain region 207'. The signal charge is accumulated in a pn-junction cavity capacitor formed between the drain region 207' and the PWL 203 to impart a potential to the pixel electrode 213 through the aluminum electrode 209. The potential application to the gate electrode 205 is suspended when the potential of the pixel electrode 213 reaches a given value so that the pixel switching transistor is in an OFF state. The signal charge accumulated in the pn-junction capacitor fixes the potential of the pixel electrode 213 before the pixel switching transistor is redriven. The fixed potential of the pixel electrode 213 drives the liquid crystal 214 encapsulated between the substrate 201 and the counter substrate 220 shown in FIG. 30H.

The pixel electrode 213 of the active matrix substrate has a smooth surface as shown in FIG. 30H, and an insulating layer is embedded into the gap between two adjacent pixel electrodes. Thus, the alignment film 215 formed thereon has a smooth surface, which prevents a decrease in light efficiency due to light scattering, a decrease in contrast due to insufficient rubbing, and the formation of an emission line due to a horizontal electric field formed by a step between two pixel electrodes. As a result, the quality of the displayed image is improved.

An active matrix liquid crystal display device generally has a pixel electrode in the display section and a pixel switch for applying a desired potential to the pixel electrode, as in the above-mentioned configuration. A holding capacitor is generally provided to maintain the potential of the pixel electrode. In a typical embodiment, a conductive (lead) layer as a common potential lead is provided under the pixel electrode for stabilizing the potential of the pixel by capacitor coupling with the pixel electrode. The common potential lead can also be used as a shading layer of the pixel switch, and can also function as a shading layer of the transistor in the peripheral driving circuit. The potential of the shading layer is fixed to a predetermined value as described in an embodiment in Japanese Patent Laid-Open No. 9-73103.

In a typical configuration of a liquid crystal display device, the substrate with pixels and the counter substrate are bonded to each other with an adhesive or a sealant applied at the peripheral edges of the display section and a liquid crystal is displaced in the gap formed between the two substrates. Since the display characteristics and their uniformity depend on the gap between the two substrates, a gap having a desired distance must be formed with high accuracy. Such a gap distance can be controlled by the size of spherical particles (termed "spacers") to be interposed between the substrates. The spacers may be fixed with the sealant and applied onto the substrate.

When the shading layer is arranged in the sealing section in which the sealant is applied, pressurizing of the spacers may cause mechanical rupture of the spacers in some cases, resulting in short-circuiting of the shading layer to other sections such as the substrate and the lead.

SUMMARY OF THE INVENTION

Accordingly, it is an object of the present invention to solve the above-mentioned problems by providing a matrix substrate.

It is an object of the present invention to provide a matrix substrate including a plurality of pixel electrodes arranged in a matrix, and a driving circuit region and a sealing region provided in the peripheral region of the plurality of pixel electrodes, a sealant, a spacer material and a liquid crystal material being disposed between the plurality of pixel electrodes and a counter substrate to constitute a liquid crystal display device. A first conductive layer is provided under the plurality of pixel electrodes, a second conductive layer is provided under the sealing region for arranging the sealant and the spacer material, and the first conductive layer is electrically separated from the second conductive layer.

It is another object of the present invention to provide a liquid crystal display device including: a matrix substrate comprising a plurality of pixel electrodes arranged in a matrix, and a driving circuit region and a sealing region provided in the peripheral region of the plurality of pixel electrodes; a sealant, a spacer material and a liquid crystal material being disposed between the plurality of pixel electrodes and a counter substrate. The matrix substrate is provided with a first conductive layer under the plurality of pixel electrodes, a second conductive layer is provided under the sealing region for arranging the sealant and the spacer material, and the first conductive layer is electrically separated from the second conductive layer.

Electrical separation between the first conductive layer and the second conductive layer can prevent a decreased yield. Such an advantage is further prominent when the second conductive layer under the sealing region is in a floating state.

Preferably, in the matrix substrate and liquid crystal display device in accordance with the present invention, a desired potential is applied to the first and second conductive layers.

Preferably, the matrix substrate is formed of a first conductive-type semiconductor substrate and a second conductive-type region is formed under the sealing region.

The second conductive-type region may be a floating region or may have the same potential as that of the first conductive layer. Alternatively, almost of the conductive layer under the sealing region may be floating.

A metallic layer of the same layer as the pixel electrode may cover the gap between the first conductive layer and the second conductive layer or between the second conductive layer and a conductive layer provided under the driving circuit region.

A glass sheet is preferably arranged on the counter substrate. A microlens group is preferably arranged on the counter substrate. An element of the microlens group is arranged to three of the plurality of pixel electrodes.

A projection-type liquid crystal display preferably uses the above-mentioned liquid crystal display device. Preferably, an image formed by said liquid crystal display device is projected by separating a blue light component using a high-reflectance mirror and a blue-light reflecting dichroic mirror and by separating a red light component from a green light component using a red-light reflecting dichroic mirror and a green/blue-light reflecting dichroic mirror.

The sealant and the spacer on the periphery of the liquid crystal display device hold the distance between the pixel electrode and the counter substrate constant. The conductive layers constituting shading layers, which are electrically separated from each other, will short-circuit to the substrate or a lead even when mechanical rupture occurs by the pressure of the spacer. The floating potential of the shading layer at the sealing section secures the stabilized operation of the device regardless of the pressure by the spacer and thus improves the production yield.

The projection-type liquid crystal display device in accordance with the present invention uses a reflection-type liquid crystal panel with a microlens, and an optical system for illuminating three primary light beams from different directions, so that modulated reflecting light beams from a suit of RGB pixels for one pixel unit are emitted through the same microlens element. Thus, the display device can display a high-quality image free of an RGB mosaic pattern.

The light beams from each pixel are substantially collimated by passing twice through the microlens. Thus, A bright projected image is displayed on a screen even when an inexpensive projection lens with a low aperture is used.

An image with having higher quality, higher brightness and a higher density is achieved by planarization of the pixel electrode enabling exact reflection of light beams.

Further objects, features and advantages of the present invention will become apparent from the following description of the preferred embodiments with reference to the attached drawings.

DESCRIPTION OF THE PREFERRED EMBODIMENT

First Embodiment

Figure 1:
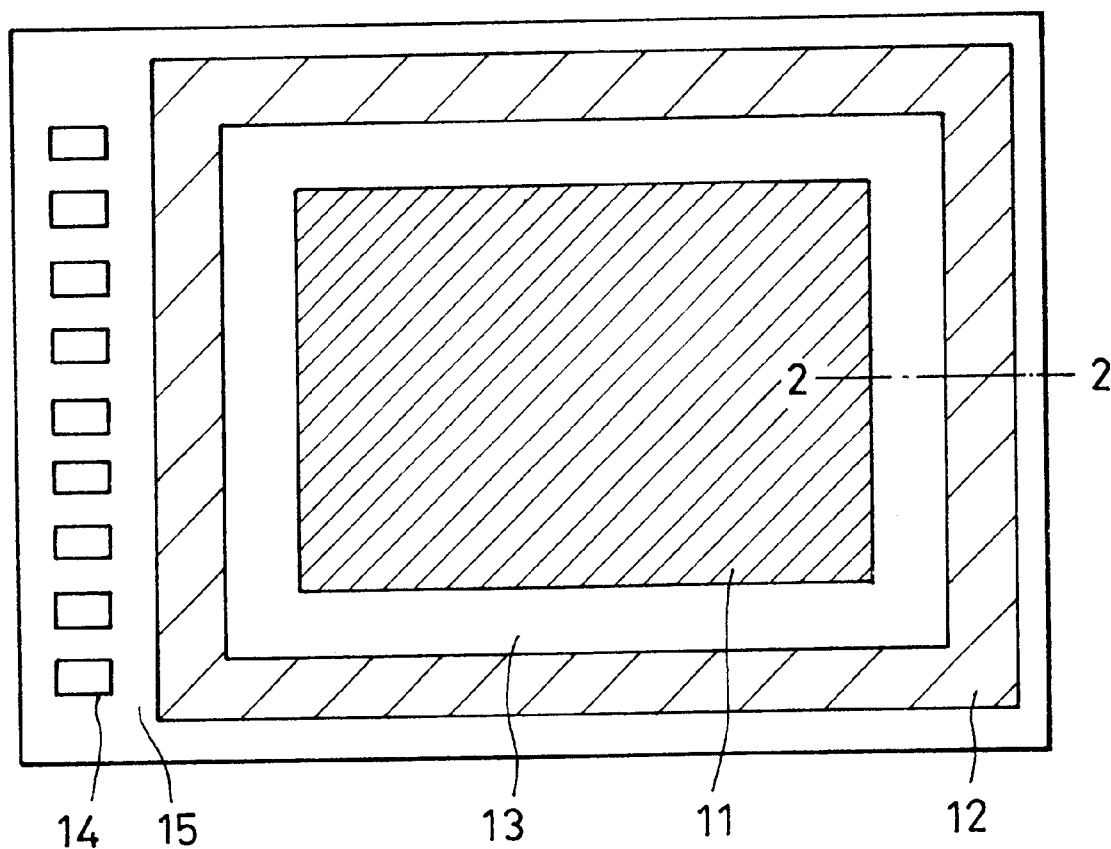
FIG. 1 is a plan view of a liquid crystal display device in accordance with an embodiment of the present invention.
Figure 2:
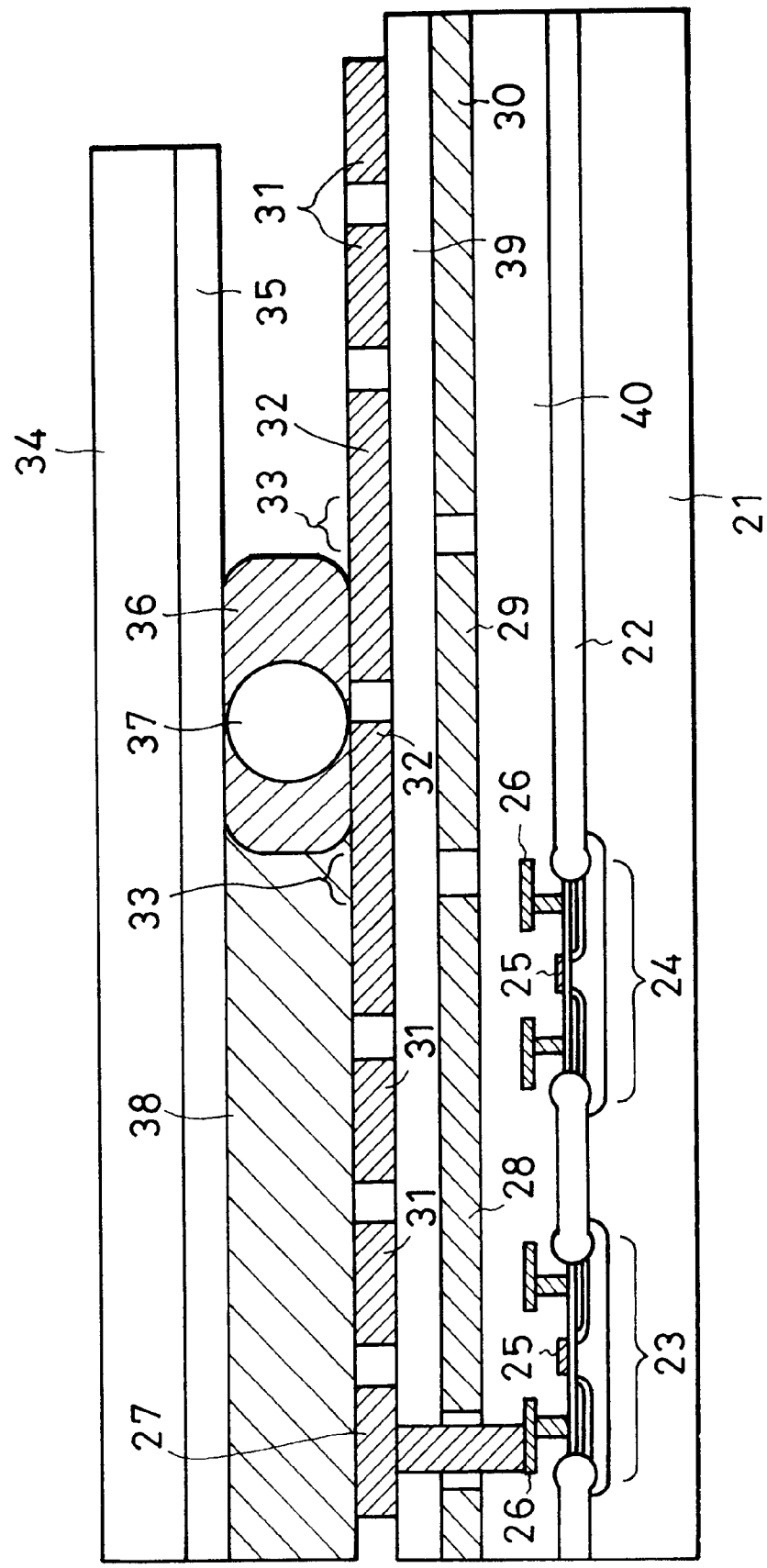
FIG. 2 is a cross-sectional view of a liquid crystal display device in accordance with an embodiment of the present invention.

FIG. 1 is a plan view of a liquid crystal display device in accordance with a first embodiment of the present invention, and FIG. 2 is a cross-sectional view taken along sectional line 2—2 of FIG. 1. With reference to FIG. 1, the liquid crystal display device includes a display region 11 provided with a liquid crystal layer, a sealing region 12 in which a sealant and a spacer material are applied thereon, a driving circuit region 13 which includes horizontal and vertical shift registers and drives the liquid crystal panel, a terminal pad section 14 for connecting to external circuits, and a region 15 which is used as a part of the driving circuit region 13 and for marking for packaging and processing steps.

With reference to FIG. 2, a semiconductor substrate 21 is used in this embodiment. A transparent insulating substrate may also be used in the present invention. The liquid crystal display device includes a selective oxide film 22 such as a LOCOS film, a pixel transistor 23 having an electrode for applying a signal voltage to either a source or a drain, a driving transistor 24 constituting a driving circuit for driving the liquid crystal panel, gate leads 25 of the driving transistor 24, and a wiring layer 26 connecting to one end of the driving transistor 24. The drain of the pixel transistor 23 is connected to the pixel electrode 27 through the wiring layer 26. When a transparent insulating substrate such as a glass substrate is used as the substrate 21, the pixel transistor 23 and the driving transistor 24 may be composed of polysilicon, amorphous silicon, or thin-film single-crystal silicon. These transistors may be formed by providing the selective oxide film 22 or by mesa separation by means of etching.

With reference to FIGS. 1 and 2, a conductive layer 28 covers the display region 11 and the driving circuit region 13. A capacitor is formed between the conductive layer 28 and the pixel electrode 27. A desired potential (hereinafter referred to as a common potential) is applied to the conductive layer 28 through the terminal pad section 14 which is connected to the wiring layer 26. The conductive layer 28 prevents optical leakage of the pixel transistor 23 and the driving transistor 24. A conductive layer 29 lies on the sealing section 12 and is electrically separated from the conductive layer 28. The wiring layer 26 may be arranged under the conductive layer 29. A conductive layer 30 may be arranged in a portion of the region 15 to suppress generation of optical carriers and to enhance the flatness.

In the layer forming the pixel electrode 27, dummy patterns 31 and 32 are formed at positions other than the display section. The dummy patterns 31 and 32 improve the flatness in the chip and thus the gap accuracy of the liquid crystal. Effective dummy patterns 31 and 32 are of islands having the same size as the pixel electrode 27. Above divisional sections 33 which separate the conductive layers 28, 29 and 30 from each other, dummy patterns 32 are arranged so as to cover the divisional sections 33. The dummy patterns 32 prevent incident light reaching the substrate 21 or the transistors 23 and 24. A transparent electrode 35 is formed on the surface of a counter substrate 34. The counter substrate 34 is fixed with a sealant 36 and a spacer 37, and the resulting liquid crystal layer 38 is filled with a liquid crystal. Since the gap of the liquid crystal layer 38 greatly affects optical characteristics of the liquid crystal, the gap distance must be uniform in the entire plane and between chips. When the spacer 37 is strongly pressurized to maintain a uniform gap distance, the dummy patterns 32, the conductive layer 29 or the selective oxide film 22 may be damaged.

In this embodiment, the conductive layer 29 is floating. This floating configuration can prevent short-circuiting of the common potential to other leads caused by such damage, although the potential of the conductive layer 29, lying under the divisional section 32 and the insulating layer 39 therebetween, may be equalized to that of the substrate 21. The yield of the device will further improve when a floating metallic layer is arranged in the same level as that of the wiring layer 26 which lies under the conductive layer 29 and the insulating layer 40 therebetween.

The floating conductive layer 29 will also decrease the failure rate when the driving circuit lies under the sealing region in this embodiment.

Second Embodiment

Figure 3:
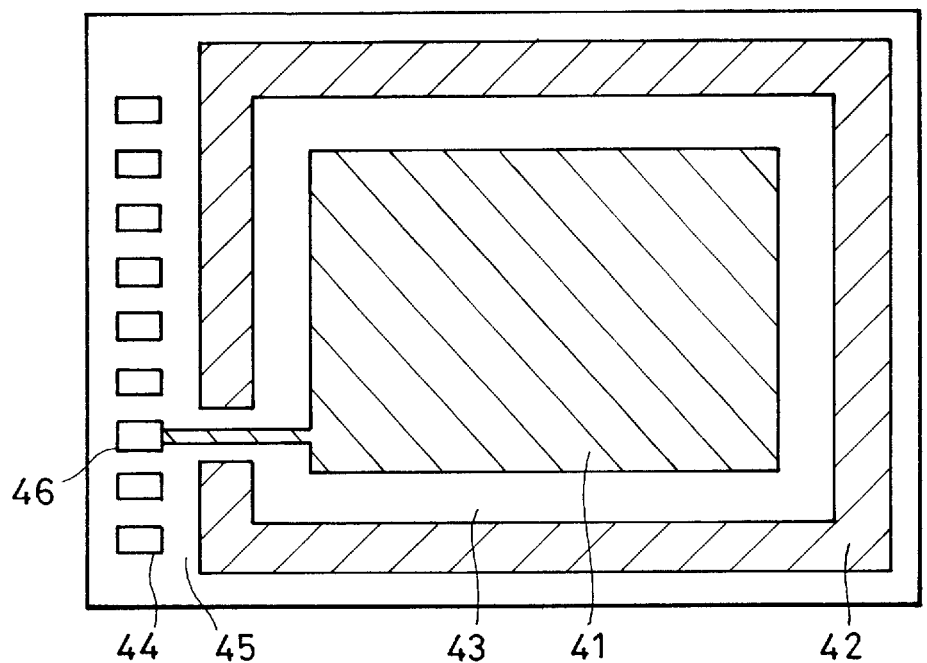
FIG. 3 is a plan view of a liquid crystal display device in accordance with an embodiment of the present invention.

A second embodiment of the present invention will now be described with reference to the drawings. This embodiment is effective when a part of the conductive layer having the common potential breaks through the sealing region. FIG. 3 is a plan view of a liquid crystal display device having a liquid crystal display region. The liquid crystal display device includes a sealing region 42 for applying a sealant and a spacer material, a driving circuit region 43 which includes horizontal and vertical shift registers and drives the liquid crystal panel, a terminal pad section 44 connecting to external circuits, and a region 45 which is used as a part of the driving circuit region 33 and for marking for packaging and processing steps. The liquid crystal panel further includes a conductive layer region 41 provided on a display region and a display electrode.

In this embodiment, a common potential is applied to the conductive layer 41 through a wiring layer composed of the conductive layer itself, which is connected to a pad 46 in the terminal pad section 44. In this embodiment, a part of the conductive layer 41 breaks through the sealing region 42. Since the area of the common potential section across the sealing region 42 is small, the failure rate is reduced. As in the first embodiment, a floating wiring layer arranged in the sealing region will reduce the probability of malfunction of the circuit even if the common potential section is damaged. Alternatively, the section across the sealing region 42 may be connected using a lower wiring layer lying under the conductive layer 41 having the common potential to prevent a failure.

Also in the cross-sectional configuration of this embodiment, a transparent electrode 35 is formed on a counter substrate 34 facing the pixel electrode, as shown in FIG. 2. The counter substrate 34 is fixed with a sealant 36 and a spacer 37, and a liquid crystal layer 38 is formed in the resulting gap. Since the gap of the liquid crystal layer 38 greatly affects optical characteristics of the liquid crystal, the gap distance must be uniform in the entire plane and between chips. The spacer 37 is, therefore, strongly pressurized, and a dummy pattern 32, a conductive layer 29 or a selective oxide film 22 having high mechanical strength is provided. The conductive layer 41 may be a metallic film as a transparent electrode which is deposited on the counter substrate 34. Alternatively, the conductive layer 41 may be an entire transparent electrode 35 as a common electrode, and holes may be formed by etching at required positions.

Third Embodiment

A third embodiment will now be described with reference to FIG. 4. The liquid crystal display device includes a display region 51 having a liquid crystal layer, a sealing region 52 for applying a sealant and a spacer material, a driving circuit region 53, a terminal pad section 54 for connecting to external circuits, and a region 55 which is used as a part of the driving circuit region 53 and for marking for packaging and processing steps.

Figure 4:
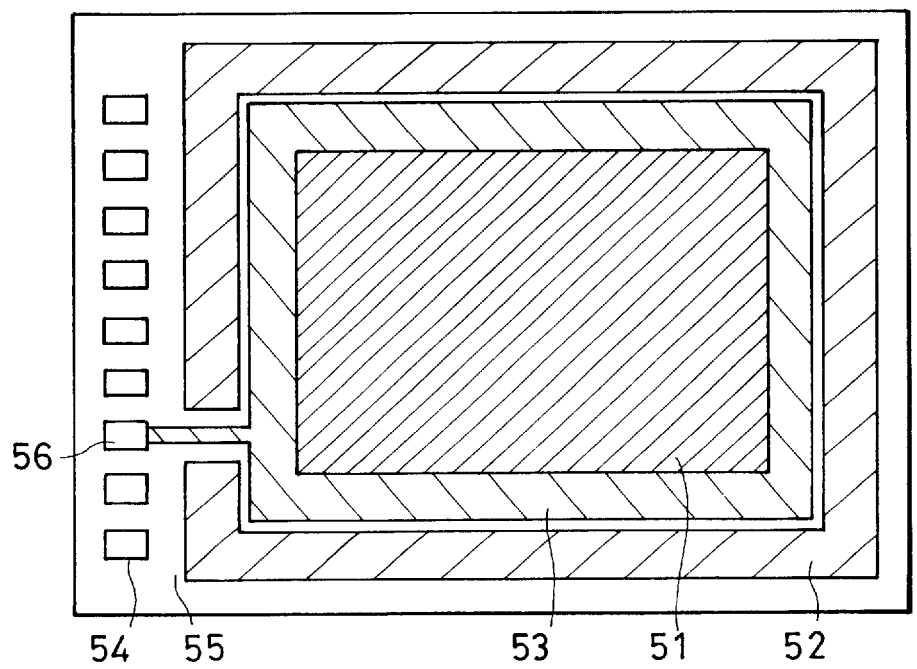
FIG. 4 is a plan view of a liquid crystal display device in accordance with an embodiment of the present invention.

In FIG. 4, a conductive layer on the display region 51 is not separated from, but is connected to, a conductive layer on the driving circuit 53. The conductive layer on the driving circuit 53 is fixed to a common potential. Since the conductive layer 52 on the sealing region is separated from the conductive layer on the driving circuit 53, short-circuiting therebetween can be prevented even when damage caused by the spacer occurs in the sealing region 52. Further, this embodiment can suppress leakage of light into the pixel switch 25 and the driving circuit 26 in FIG. 2, and as a result prevent deterioration of images and unsuccessful operation of the circuits due to the leaked light.

The conductive layer shown in FIG. 2 may be floating in this embodiment. When the spacer forms a noticeable defect, short-circuiting of the conductive layer 28 to other wiring layers will not occur, although the potential of the conductive layer 29 is equalized to the potential of the substrate 21. The yield of the device will further improve when a floating metallic layer is arranged in the same level as that of the wiring layer 26 which lies under the conductive layer 29 and the insulating layer 40 therebetween.

Fourth Embodiment

Figure 5:
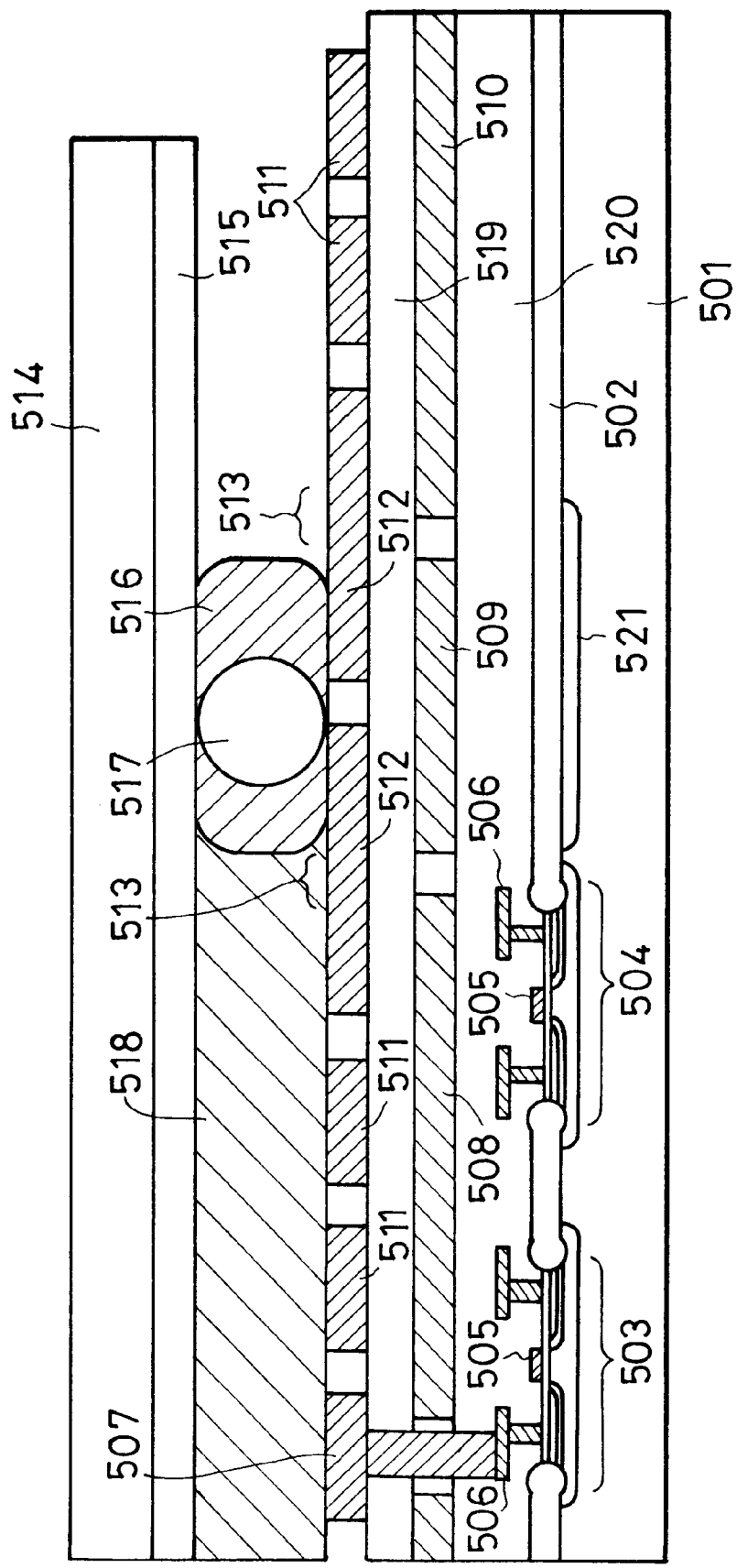
FIG. 5 is a cross-sectional view of a liquid crystal display device in accordance with an embodiment of the present invention.

The liquid crystal display devices in the first to third embodiments may have a cross-sectional configuration as shown in FIG. 5. The configuration in FIG. 5 is substantially the same as the configuration in FIG. 2, except that a well 521 is provided under the selective oxide film 502 in FIG. 5. The well 521 is of a conducting type that is the reverse of the type of the substrate 501. It is preferable that the well 521 be floating. For example, when the substrate 501 is a p-type, the well 521 is preferably a floating n-type.

Figure 6:
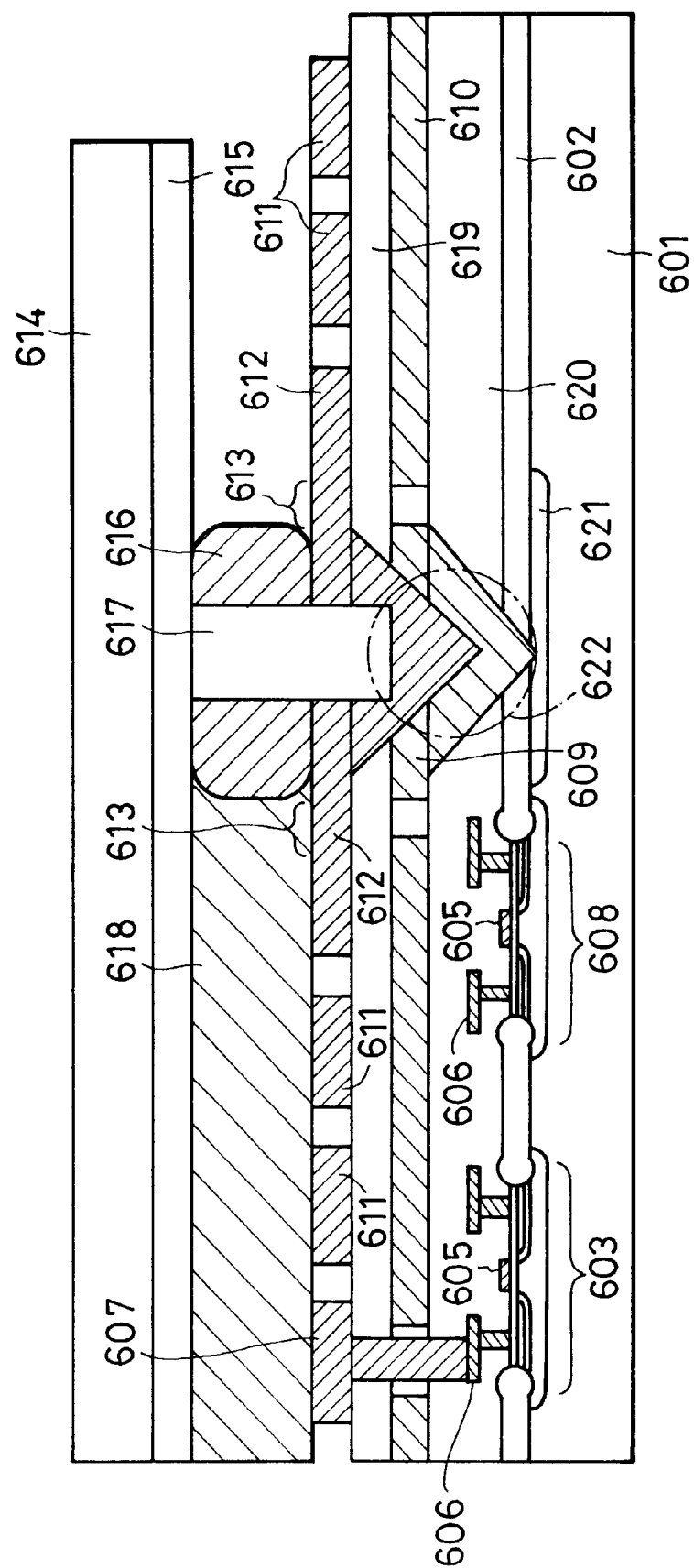
FIG. 6 is a cross-sectional view of a liquid crystal display device in accordance with an embodiment of the present invention.

Advantages in this embodiment will now described with reference to FIG. 6. In FIG. 6, the well 621 corresponding to the well 521 in FIG. 5 is provided under the selective oxide film 602 corresponding to the selective oxide film 502 in FIG. 5, and a column spacer 617 is used instead of the spherical spacer 517 in FIG. 5.

FIG. 6 describes a damaged site 622 when the column spacer 617 vertically invades the lower portion. In the damaged site 622, the dummy pattern 612 (a second conductive layer) and the conductive layer 609 short-circuits, and the conductive layer 609 comes into contact with the substrate 601. When a well 621 is not provided and when there is only a damaged site 622, the conductive layer 609 has the same potential as that of the substrate. When there are a plurality of damaged sites in which a part of the conductive layer with a common potential on the driving circuit 53 shown in FIG. 4 is damaged in the portion crossing the sealing region 52, the floating conductive layer 609 may short-circuit the sections with other potentials. In contrast, a well 621 is provided in this embodiment. Thus, the damaged site 622 will cause severe failure modes, although the potential of the well 621 is equalized to that of the substrate 601. For example, when the substrate 601 is fixed to the ground electrical power source, short-circuiting of the well 621 to a positive potential other than the ground does not result in short-circuiting of the electrical power source, because a reverse biasing potential is applied between the well 621 and the substrate 601. Such an advantage is confirmed in a combination of a n-type substrate and a p-type well 621.

The well 621 may be previously connected to the common potential in order to prevent short-circuiting between the common potential and the substrate potential.

Fifth Embodiment

Figure 7:
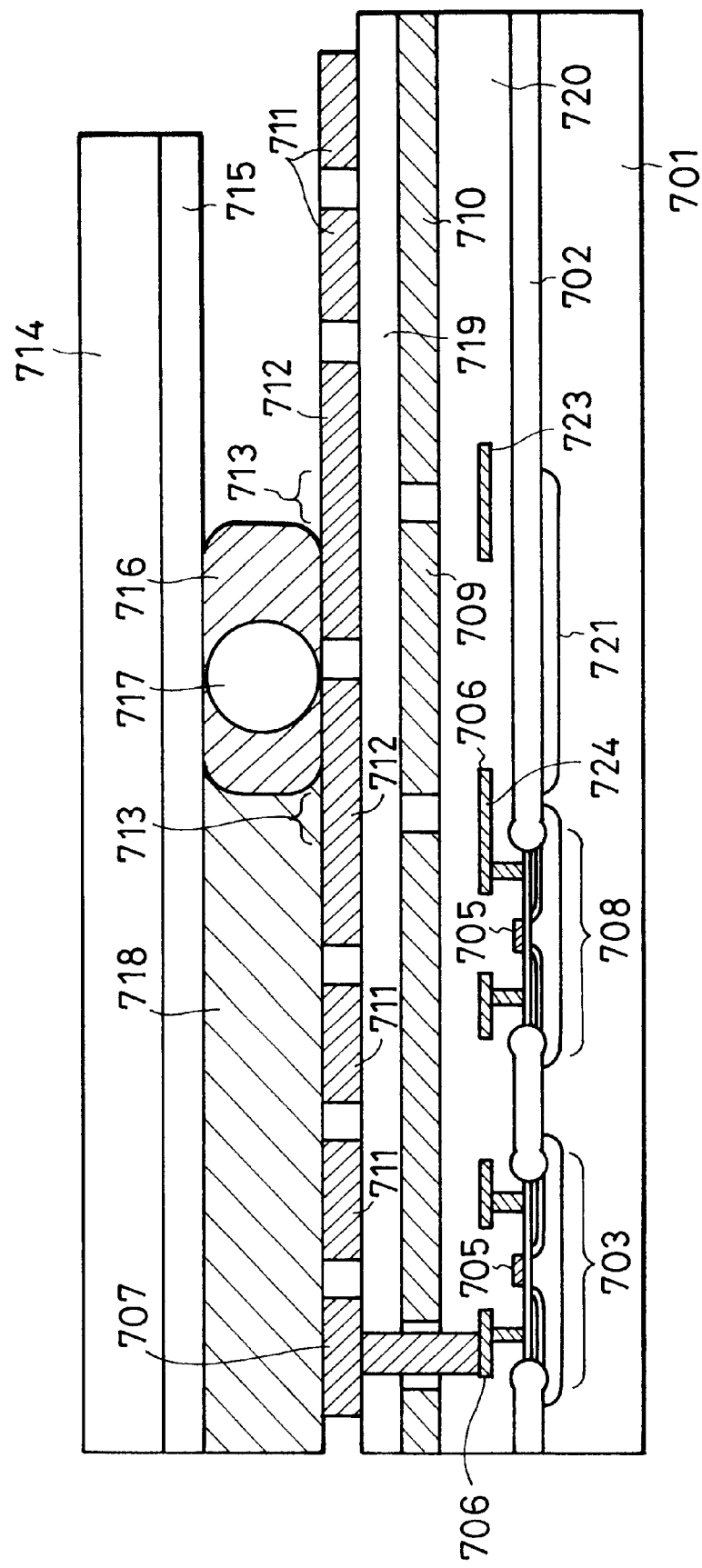
FIG. 7 is a cross-sectional view of a liquid crystal display device in accordance with an embodiment of the present invention.

FIG. 7 is a cross-sectional view illustrating a fifth embodiment of the present invention. In this embodiment, a well 721 described in FIGS. 5 and 6 is provided under an insulating separation layer 702 and wiring layers 723 and 724 are provided in an insulating layer 720 on the insulating separation layer 702. Other elements are the same as those in FIGS. 5 and 6.

Divisional sections 713 are provided for separating dummy patterns 712 as conductive layers under a spacer 717 a sealant 716, and are shielded from light by leads 723 and 724 formed of a wiring layer 706. Since a divisional section 713 is shielded from light by at least one of the dummy pattern 712 and the lead 723 or 724, light leakage will not be observed in a liquid crystal display device irradiated with strong incident light beams.

Thus, this embodiment can achieve a liquid crystal display device that is free of light leakage, has high gap accuracy, can be produced with a high yield and at reduced cost, and has a high, uniform brightness.

Sixth Embodiment

Figure 8:
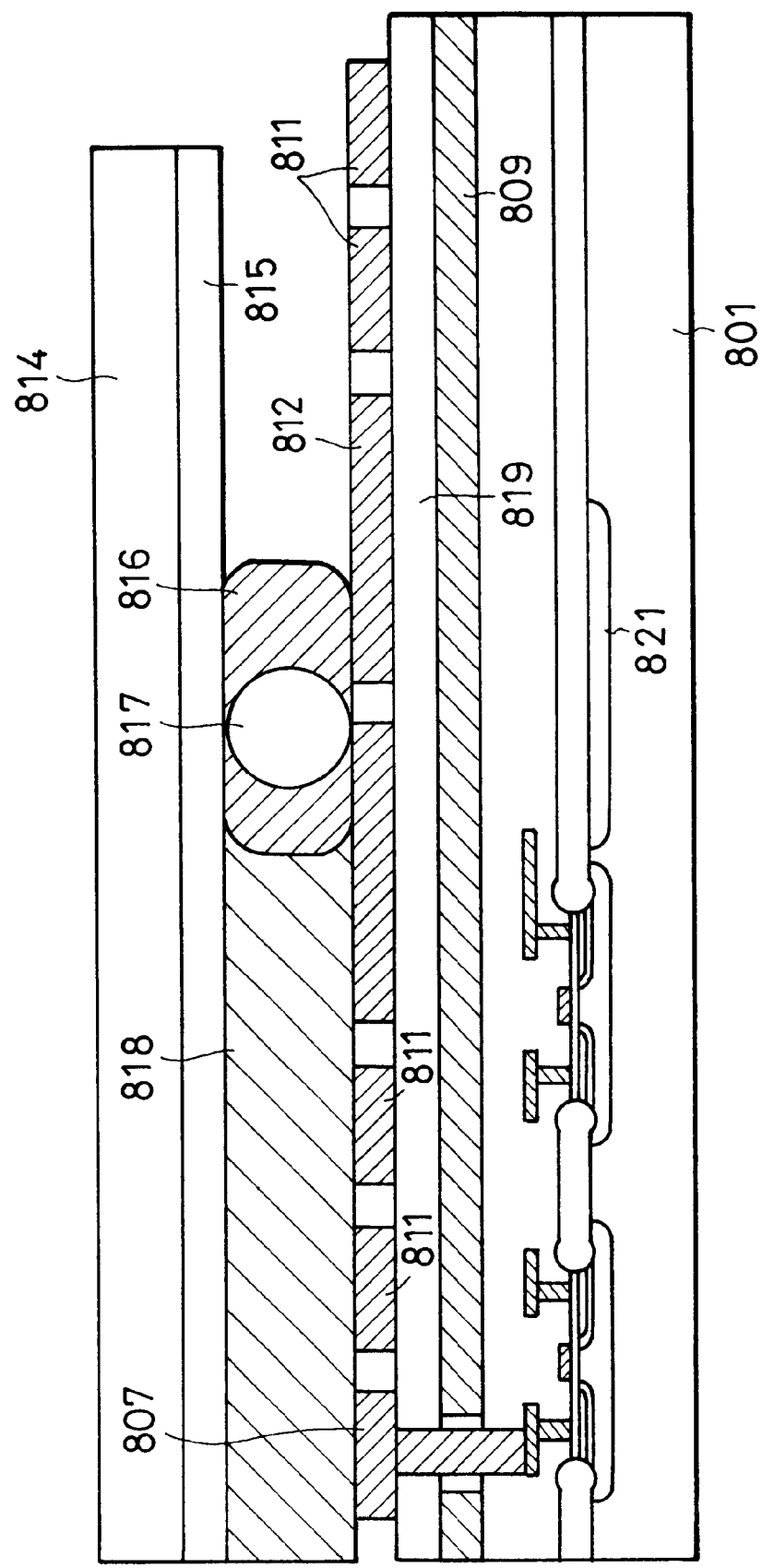
FIG. 8 is a cross-sectional view of a liquid crystal display device in accordance with an embodiment of the present invention.

FIG. 8 is a cross-sectional view of a liquid crystal display device of a sixth embodiment in accordance with the present invention. In this embodiment, a conductive layer 809 in the sealing region also has the common potential. A semiconductor substrate under the sealing region is a floating well 821. Other configurations are substantially the same as those in FIG. 2. For example, the substrate 801 is a p-type semiconductor, and the well region 821 is an n-type semiconductor. When the conductive layer in the sealing region comes into contact with the substrate by mechanical rupture caused by a spacer 817, the well will have the common potential. Since a reverse biasing potential is applied between the well and the substrate, such mechanical rupture will not cause short-circuiting. Thus, the liquid crystal display device will operate normally. The advantage in this embodiment is also confirmed when the potential of the well 821 is the same as that of the conductive layer 809.

Seventh Embodiment

A seventh embodiment includes a liquid crystal display device for precharge driving of a video signal introduced from a video line in a pixel electrode array.

Figure 9:
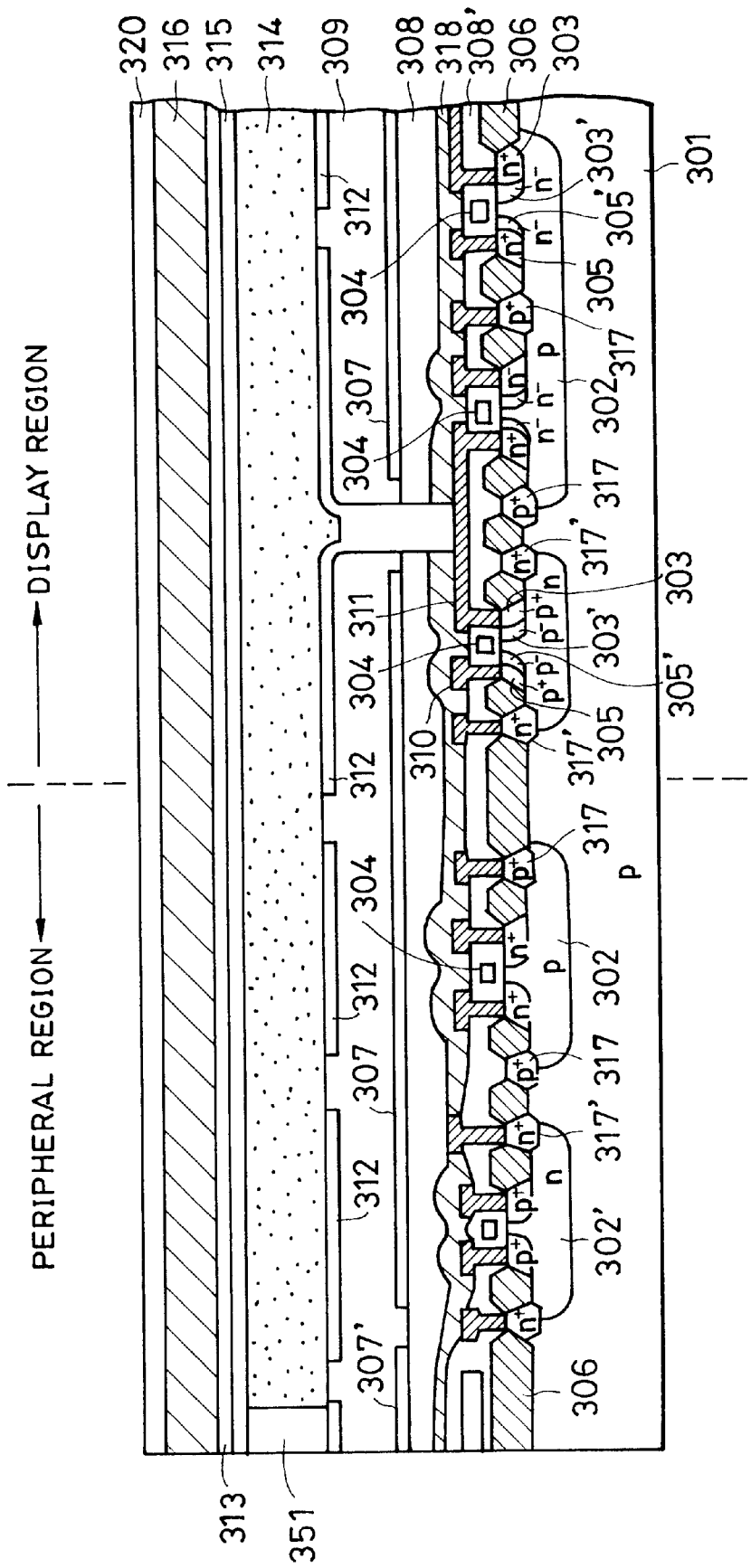
FIG. 9 is a cross-sectional view of a liquid crystal display device produced by CMP in accordance with the present invention.

FIG. 9 is a cross-sectional view of a liquid crystal panel in this embodiment. The liquid crystal panel includes a semiconductor substrate 301, p-type wells 302, n-type wells 302', source regions 303 and 303', gate regions 404, and drain regions 305 and 305' of transistors.

Figure 10:
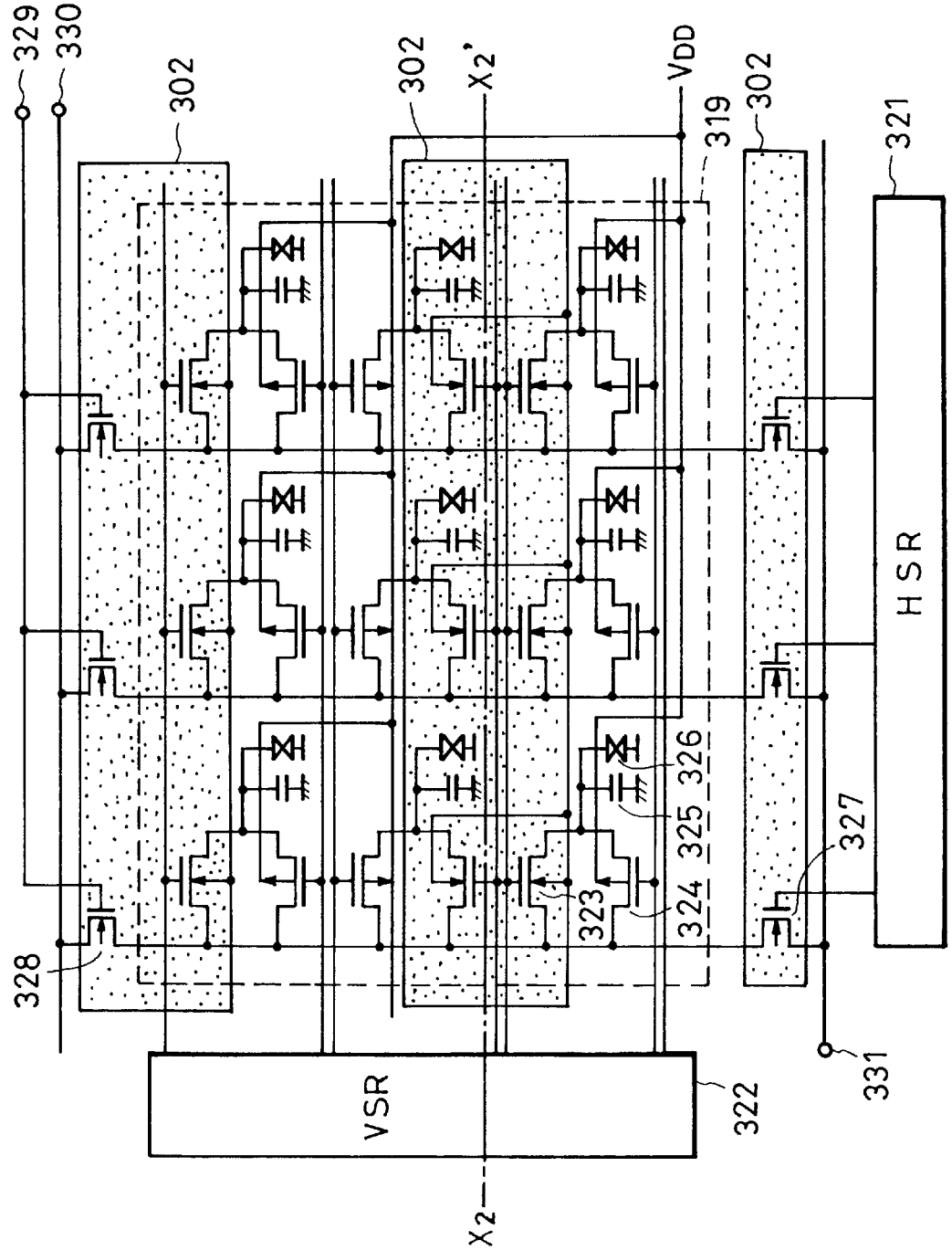
FIG. 10 is an outlined circuit diagram of a liquid crystal display device in accordance with the present invention.

Since a high voltage of 20 to 35 V is applied to each transistor of the display region, the source and drain regions are not formed by self-alignment in relation to the gate 304, but are offset. A low concentration of n⁻-layer 303' and a low concentration of p⁻-layer 305 are provided therebetween as the source region 303' and the drain region 305', respectively. A preferable offset distance is 0.5 to 2.0 µm. A part of peripheral circuit section is shown in FIG. 10. A source layer and a drain layer are formed by self-alignment in the peripheral circuit section.

The offset distance or the gate length may vary depending on the tolerance voltage. Since a part of the peripheral circuit consists of a logic circuit driving at a voltage of 1.5 to 5 V, a self-alignment configuration is employed for the purpose of miniaturization of transistors and improvement in driving characteristics of transistors. The substrate 301 consists of a p-type semiconductor and has a minimum potential, generally a standard grounding potential. The p-type well in the display region has a voltage for applying to the pixel in a range of 20 to 35V. A logic driving voltage of 1.5 to 5V is applied to the peripheral logic circuit. The above-mentioned configuration is optimized based on these voltages, and contributes to chip size reduction and high-quality display due to an improved driving speed.

With reference to FIG. 9, the liquid crystal panel also includes a field oxide film 306, a source electrode 310 connecting to a data line, a drain electrode 311 connecting to a pixel electrode, a pixel electrode 312 which also functions as a reflecting mirror, and shading layers 307 and 307' for shading the peripheral region. Examples of materials suitable for the shading layers include Ti, TiN, W and Mo. The shading layer 307' under the sealing section is electrically separated from the shading layer 307 under the display region. The shading layer 307 covers the display region other than the connection of the pixel electrode 312 and the drain electrode 311. In a large wiring capacity region, such as video lines and clock lines, of the peripheral pixel region, the shading layer 307 covers the layer of the pixel electrode 312 in order to prevent a malfunction of the circuit caused by leakage of illuminating light. A P-SiO insulating layer 308 under the shading layer 307 is planarized by SOG on a P-SiO layer 318 to secure the stability of the insulating layer 308. Planarization by SOG can be replaced with CMP of the insulating layer 308 of phosphotetraetoxysilane (P-TEOS) on the P-SiO layer 318.

An insulating layer 309 provided between the pixel electrode 312 and the shading layer 307 functions as a charge-holding capacitance of the pixel electrode 312. Materials for forming a large capacitance other than $SiO_2$ have high dielectric constants. Examples of such materials include P-SiN, $Ta_2O_5$, and composite films of $SiO_2$. It is preferable that the insulating layer 309 have a thickness of 500 to 5,000 angstroms.

The liquid crystal panel further includes an antireflection film 313, a liquid crystal 314, a transparent common electrode 315, a counter substrate 316, $p^+$- and $n^+$-type high-impurity regions 317 and 317', a display region 319, and an antireflection film 320. The high-impurity regions 317 and 317' have the same polarity of the wells 302 and 302' formed under the transistors. The well potential is fixed to a desired low voltage through the low-resistance layer and stabilized even when a signal of high amplitude is applied to the source. Thus, the liquid crystal panel can display a high-quality image. The $p^+$- and $n^+$-type high-impurity regions 317 and 317' are provided between the n-type well 302' and the p-type well 302 through a field oxide film. Such a configuration does not require a channel stop layer that will be generally provided under the field oxide film in a MOS transistor.

Since the $p^+$- and $n^+$-type high-impurity regions 317 and 317' are simultaneously formed in the source/drain forming step, such a configuration contributes to production cost reduction because of the reduction in the number of masks and production steps required.

The antireflection film 313 is provided between the transparent common electrode 315 and the counter substrate 316 to reduce the reflectance at the interface in view of the refractive index of the liquid crystal. A preferable antireflection film is an insulating film having a refractive index that is lower than that of the counter electrode 316 and that of the transparent electrode 315.

With reference to FIG. 10, which is a plan view illustrating this embodiment, the liquid crystal panel has a horizontal shift register 321, a vertical shift register 322, n-channel MOSFETs 323, p-channel MOSFETs 324, holding capacitors 325, liquid crystal layers 326, signal switches 327, reset switches 328, a reset pulse input terminal 329, a reset electrical power terminal 330, and an image signal input terminal 331. The substrate 301 is a p-type semiconductor in FIG. 10, but may be an n-type semiconductor.

The well region 302' has a reverse conductive type to the semiconductor substrate 301. Thus, the well region 302 is a p-type in FIG. 10. It is preferred that the p-type well region 302 and the n-type well region 302' be doped with high concentrations of impurities compared to the semiconductor substrate 301. For example, a preferable impurity concentration in the well region 302 is $10^{15}$ to $10^{17}$ $cm^{-3}$ for an impurity concentration in the semiconductor substrate 301 of $10^{14}$ to $10^{15}$ $cm^{-3}$.

With reference to FIG. 9 again, the source electrode 310 is connected to the data line for transmitting display signals, whereas the drain electrode 311 is connected to the pixel electrode 312. These electrodes are generally composed of Al, AlSi, AlSiCu, AlGeCu or AlCu. A via-metal layer composed of Ti and TiN is provided at the contact face between the lower portions of these electrodes 310 and 311 and the semiconductor to achieve stabilized contact and to reduce the contact resistance. A floating layer and/or a well region as in the first to fifth embodiments may be provided in this embodiment to secure the normal operation when the liquid crystal panel is damaged. Preferably, the pixel electrode 312 has a flat surface and is composed of a high-reflectance material. Examples of preferable materials include Cr, Au, and Ag, in addition to conventional wiring metals, such as Al, AlSi, AlSiCu, AlGeCu, and AlCu. The underlying insulating layer 309 and the pixel electrode 312 are treated by a CMP process to improve the flatness of these layers.

The holding capacitor 325 in FIG. 10 holds signals between the pixel electrode 312 and the transparent common electrode 315. A substrate potential is applied to the well region 302. This embodiment has the following transmission gate array. At the top line, n-channel MOSFETs 323 lie at the upper portion and p-channel MOSFETs 324 lie at the lower portion, whereas at the second line, p-channel MOSFETs 324 lie at the upper portion and n-channel MOSFETs 323 lie at the lower portion. That is, n-channel MOSFETs 323 and p-channel MOSFETs 324 are alternately arranged at two adjacent lines. These transistors are connected to the electrical power line near the display region through the stripe well and at the display region through a thin electrical power line.

The well resistance must be stabilized. For the p-type substrate, the contact area and sites of the n-type well inside the display region are increased compared to those of the p-type well. The p-type well has a constant potential by the p-type substrate, and the substrate functions as a low-resistance member. The reinforced contact of the n-type well to the upper wiring layer can prevent a significant change in resistance of the well which would be caused by input and output of signals between the n-type well island and the source/drain. Thus, the liquid crystal panel can display a stabilized high-quality image.

Image signals, such as video signals and pulse modulated digital signals, are input through an image signal input terminal 331 and output to each of data lines while switching a signal switch 327 in response to pulses from the horizontal shift resister 321. The vertical shift register 322 applies a high pulse and a low pulse to the gate of the n-channel MOSFET 323 and the gate of the p-channel MOSFET 324, respectively, of the selected line.

Each of switches in the pixel region is composed of a single-crystal CMOS transmission gate. Thus, signals can be output to the source not depending on the threshold value of the MOSFET. The switch, composed of a single crystal transistor and not having a crystal grain interface, can stabilize the drive of the liquid crystal panel, and thus highly reliable high-speed driving can be achieved.

Figure 11:
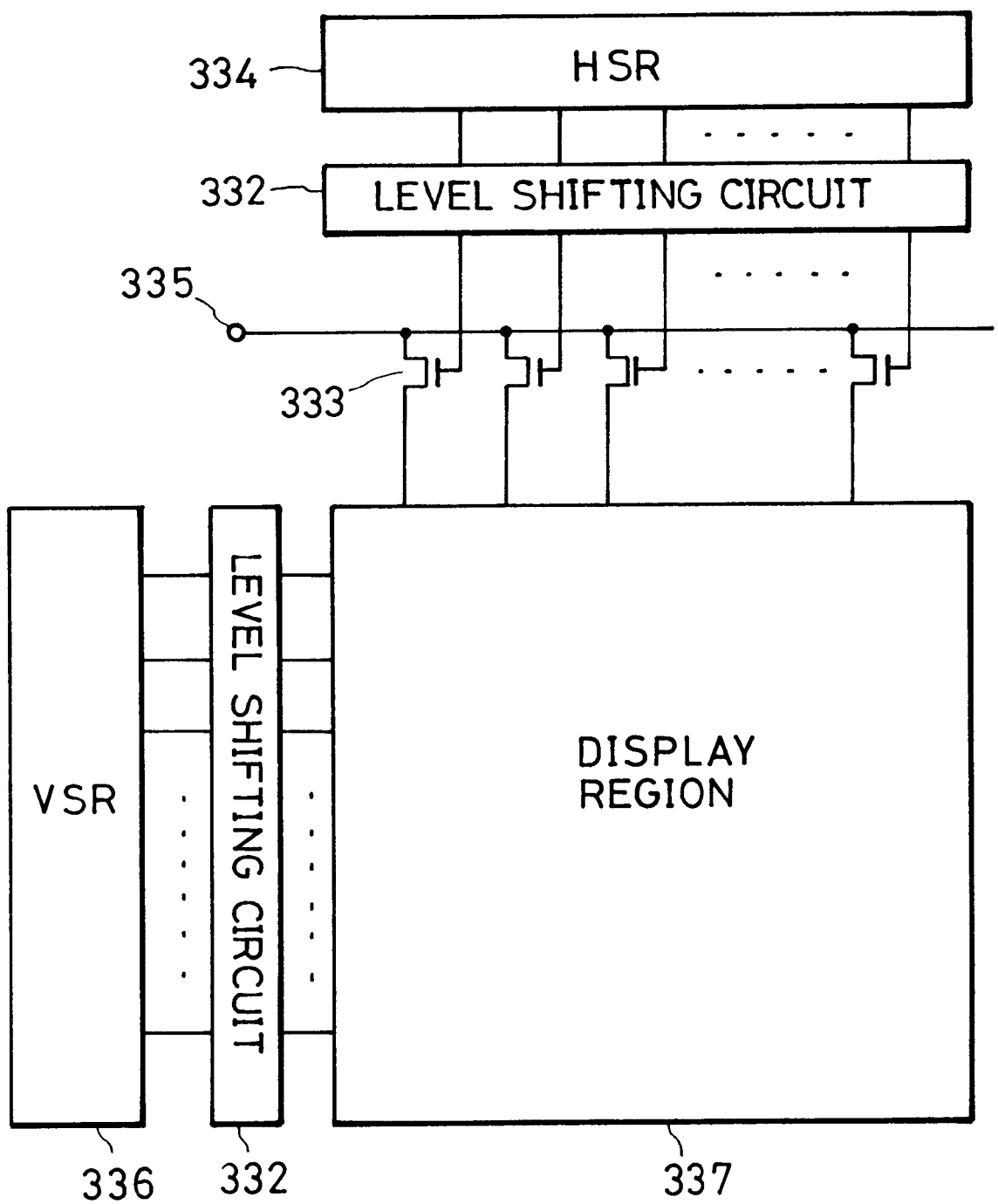
FIG. 11 is a block diagram of a liquid crystal display device in accordance with the present invention.

A configuration of the peripheral circuit of the liquid crystal panel will now be described with reference to FIG. 11. The peripheral circuit of the display region 337 includes a level shifting circuit 332, video signal sampling switches 333, a horizontal shift register (HSR) 334, a video signal input terminal 335, and a vertical shift register (VSR) 336.

The horizontal and vertical shift registers 334 and 336 enable reciprocal scanning by selection switches. Such registers allow any change in arrangement of the optical system without modification of the panel. Thus, the same type of panel can be used for various types of products, resulting in reduction in production costs. Each video signal sampling switch 333 is composed of a transistor having a single polarity in FIG. 11. The switch may be composed of a CMOS transmission gate which can output all of the signals from the video line to the signal line. This embodiment can include the circuit configurations described in the first to fifth embodiments for achieving high-quality images.

In the CMOS transmission gate configuration, video signals may fluctuate due to differences in area between the nMOS gate and the pMOS gate and in overlapping capacitance between the gate and the source/drain. The following configuration can resolve such fluctuations. A MOSFET having a gate area which is approximately ½ the gate area of the MOSFETs of the sampling switches having reverse polarities is provided. The source and drain of the MOSFET is connected to the signal line to apply reversed-phase pulses to the signal line. As a result, the liquid crystal panel can display higher-quality images.

Figure 12:
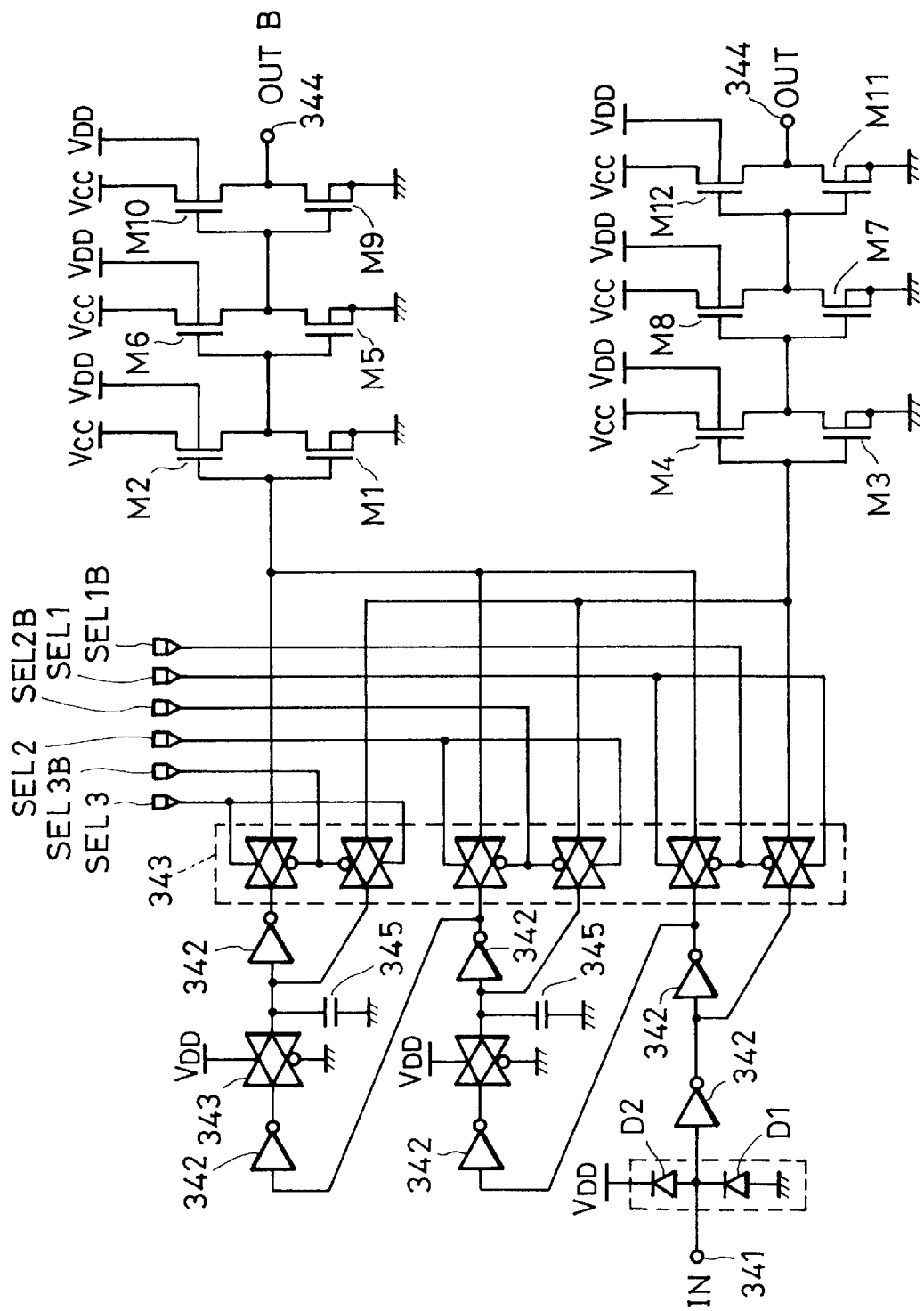
FIG. 12 is a circuit diagram including a delay circuit of an input section in a liquid crystal display device in accordance with the present invention.

FIG. 12 is a schematic diagram for illustrating exact synchronization of the video signals with the sampling pulses by changing the delaying time of the sampling pulses. Delaying inverters 342 are provided for delaying pulses, and switches 343 are provided for determining which delaying inverter 342 is selected. The sampling pulses whose delaying times are controlled are output through terminals 344. Numeral 345 represents a capacitor, symbols M1 to M11 represent drivers of a MOS configuration, symbol OUT B represents a reverse phase output to the input, symbol OUT represents a normal phase output, and numeral 345 represents a protective circuit. A combination of SEL1 (SEL1B) and SEL3 (SEL3B) determines the number of the delaying inverters 342 that the pulses pass through.

A liquid crystal panel composed of three R, G and B panels, together with the synchronizing circuit, can correct asymmetric delaying times of pulses from the exterior of the panel. Thus, the liquid crystal panel displays an image without dislocation caused by high regions of R, G and B pulse phases. A diode for measuring the temperature may be provided in the panel to correct the delaying time based the output from the diode with reference to a predetermined look-up table storing the correspondence between the diode output and the delaying time.

With reference to FIG. 9 again, a flat counter substrate configuration is described, in which the common electrode substrate 316 has unevenness to prevent reflection at the interface between the common electrode substrate 316 and the transparent common electrode 315 provided thereon. A method for forming the unevenness is sandblasting using fine abrasive grains. The unevenness enhances the contrast of the liquid crystal panel.

A polymer network liquid crystal (PNLC) is used as the liquid crystal material. A polymer dispersion liquid crystal (PDLC) may be used instead of the PNLC. The PNLC is generally prepared by a polymerization-phase separation process. A solution containing a liquid crystal and polymerizable monomers or oligomers is poured into a cell and irradiated with UV to form a polymer network in the liquid crystal. The PNLC contains a large amount of liquid crystal (70 to 90 percent by weight).

In the PNLC, a nematic liquid crystal having a highly anisotropic refractive index ($\Delta n$) shows suppressed light scattering, whereas a nematic liquid crystal having a highly anisotropic dielectric constant ($\Delta \epsilon$) is capable of being driven at a low voltage. Regarding the size of the polymer network, when the inter-center distance of the networks is 1 to 1.5 $\mu$m, light scattering is enhanced so that a sufficiently high contrast is achieved.

Figure 13:
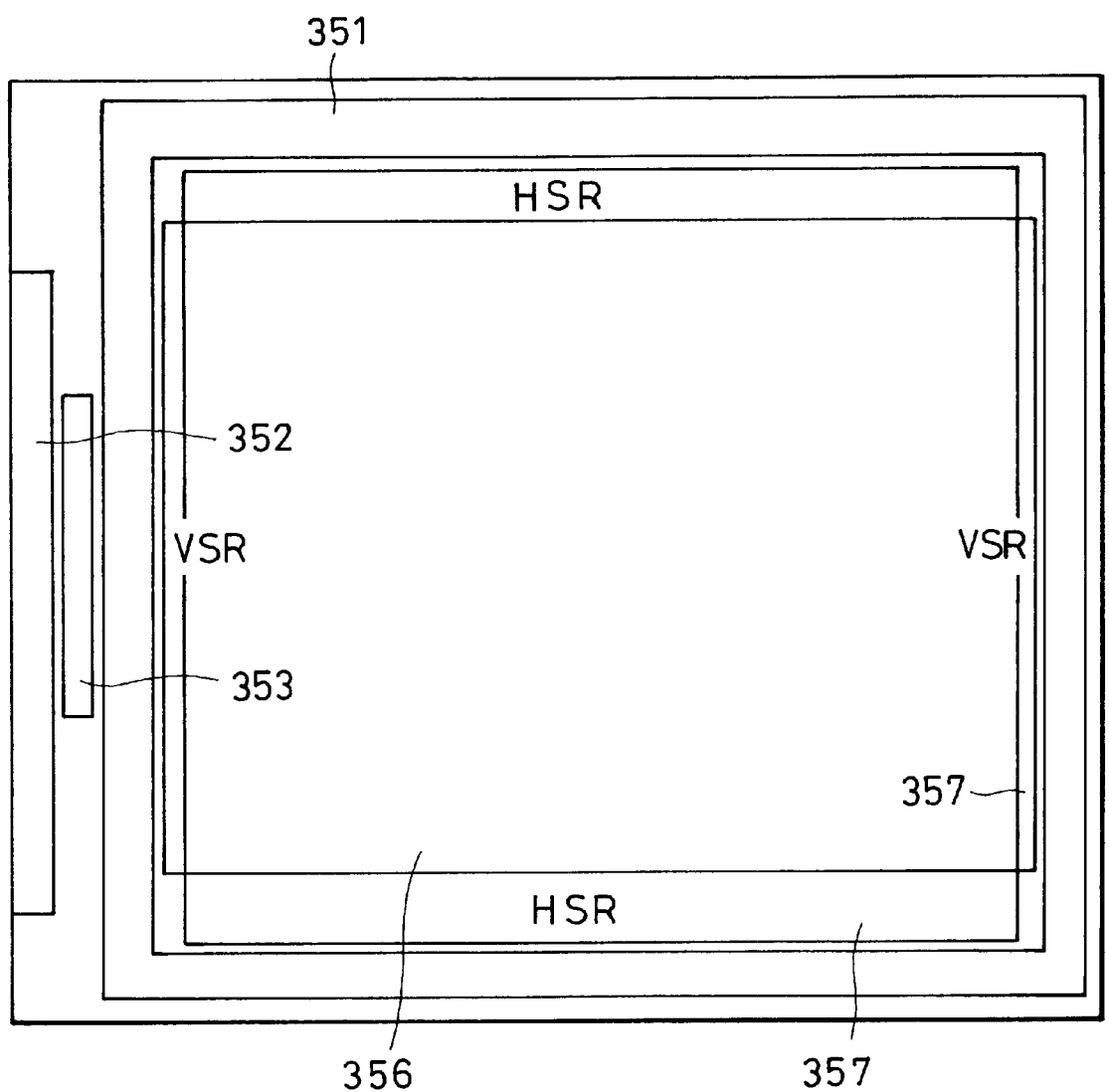
FIG. 13 is a schematic view of a liquid crystal display device in accordance with the present invention.

The relationship between the sealing configuration and the panel configuration is described with reference to FIG. 13. In FIG. 13, numeral 351 represents a sealing section, numeral 352 represents an electrode pad, numeral 353 represents a clock buffer circuit, numeral 356 represents a display section of a liquid crystal device, and numeral 357 represents a peripheral circuit section including horizontal and vertical shift registers (HSR and VSR). The sealing section 351 indicates the contact region of an adhesive with a semiconductor substrate 301 having pixel electrodes 312 and with a glass substrate having a common electrode 315. These substrates are bonded to each other by the adhesive at the peripheral region of the display section 356. A liquid crystal is encapsulated into the display section 356 and the shift register section 357.

In the present invention, as shown in FIG. 13, circuits are provided at the interior and exterior of the seal for the purpose of reducing the total chip size. In this embodiment, pad 352 is arranged at one side of the panel. Alternatively, a plurality of pads may be arranged at any side of the panel for a high-speed clock.

The side walls of the panel and the peripheral circuit section in the display region of the panel are composed of shading substrate holders, and the rear surface of the Si substrate is bonded to a high thermal conductivity metal such as Cu with an adhesive having high thermal conductivity. Such a configuration prevents a change in the substrate potential of the panel. Thus, the configuration makes it less likely that the panel will experience malfunction if the panel is irradiated with high-intensity beams, such as those produced by a projector, since the light beams are effectively shaded at the side walls of the substrate.

Figure 14:
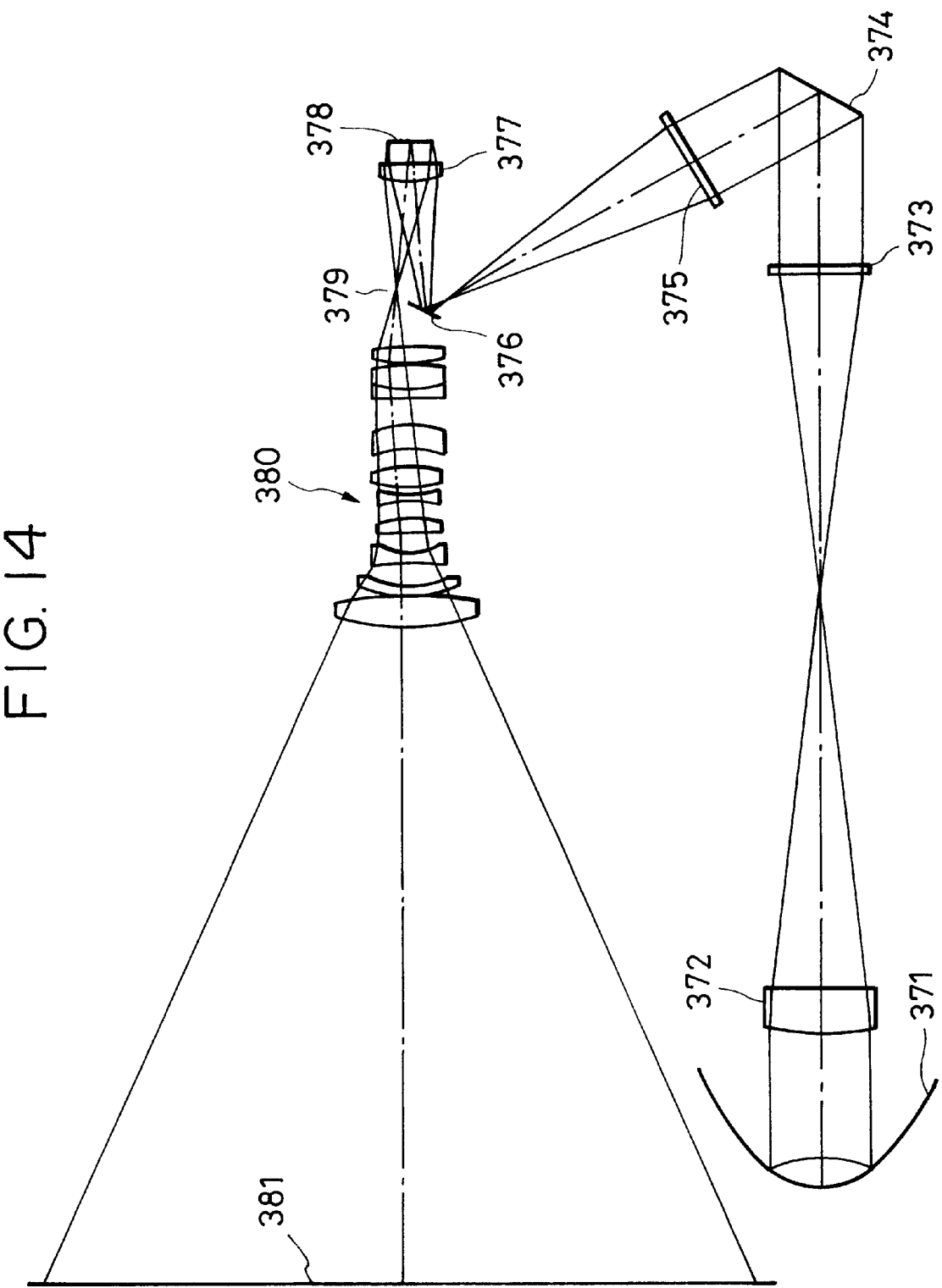
FIG. 14 is a schematic view of a liquid crystal projector using a liquid crystal display device in accordance with the present invention.

FIG. 14 is a schematic diagram of an optical system including the reflection-type liquid crystal panel in accordance with the present invention. The optical system includes a light source 371, such as a halogen lamp, a collective lens 372, convex Fresnel lenses 373 and 375, and three color separating optical elements 374 (only one element is described in FIG. 14). The color separating optical elements 374 separate the white light into R, G and B color beams. Examples of preferable color separating optical elements include a dichroic mirror and a diffraction grating.

The optical system further includes three mirrors 376, three field lenses 377, three R, G and B reflection liquid crystal devices 378, three diaphragms 379, a projection lens unit 380 and a screen 381 (in FIG. 14, only one optical system from the mirror 376 to the diaphragm 379, corresponding to one color, is described). Each mirror 376 introduces the R, G and B color beams to a respective one of the three R, G and B panels. The field lens 377 collimates the light beams from the mirror 376. The collimated light beams are reflected by the R, G and B reflection liquid crystal devices 378, enlarged by the projection lens unit 380, and projected onto the screen 381. The projection lens unit 380 consists of a plurality of lenses. The screen 381 generally includes a Fresnel lens plate and a lenticular lens plate to display clear, bright images with a high contrast. The Fresnel lens plate converts the projected light into parallel light, and the lenticular lens expands the angle of view in the vertical and horizontal directions. The triple panel configuration may be replaced with a single panel configuration which include a reflection liquid crystal device and a microlens array provided thereon. The microlens array radiate incident light beams towards any of R, G and B pixel regions in response to the colors of the light beams. The light beams are reflected by each pixel when a voltage is applied to the liquid crystal layer of the liquid crystal device. The reflected light beams are projected onto the screen through the diaphragm 379 and the projection lens unit 380.

When no voltage is applied to the liquid crystal layer, the incident light beams are isotropically scattered in the reflection liquid crystal device and substantially do not reach the projection lens unit 380. Thus, a black image is displayed. The optical system has no polarization plate and signal light beams are reflected by the entire surface of the pixel electrode with high reflectance towards the projection lens unit. Thus, the displayed image has a brightness which is two to three times higher than that of conventional systems. Further, the surface and the interface of the counter substrate is provided with an antireflection film. Thus, an image with a high contrast is achieved. The optical system enables a reduction in panel size and thus a size reduction in all of the optical units including lenses and mirrors, resulting in a reduction in the cost and weight of the system.

An integrator may be interposed between the light source and the subsequent optical system to remove problems caused by color unevenness and brightness unevenness of the light source.

Figure 15:
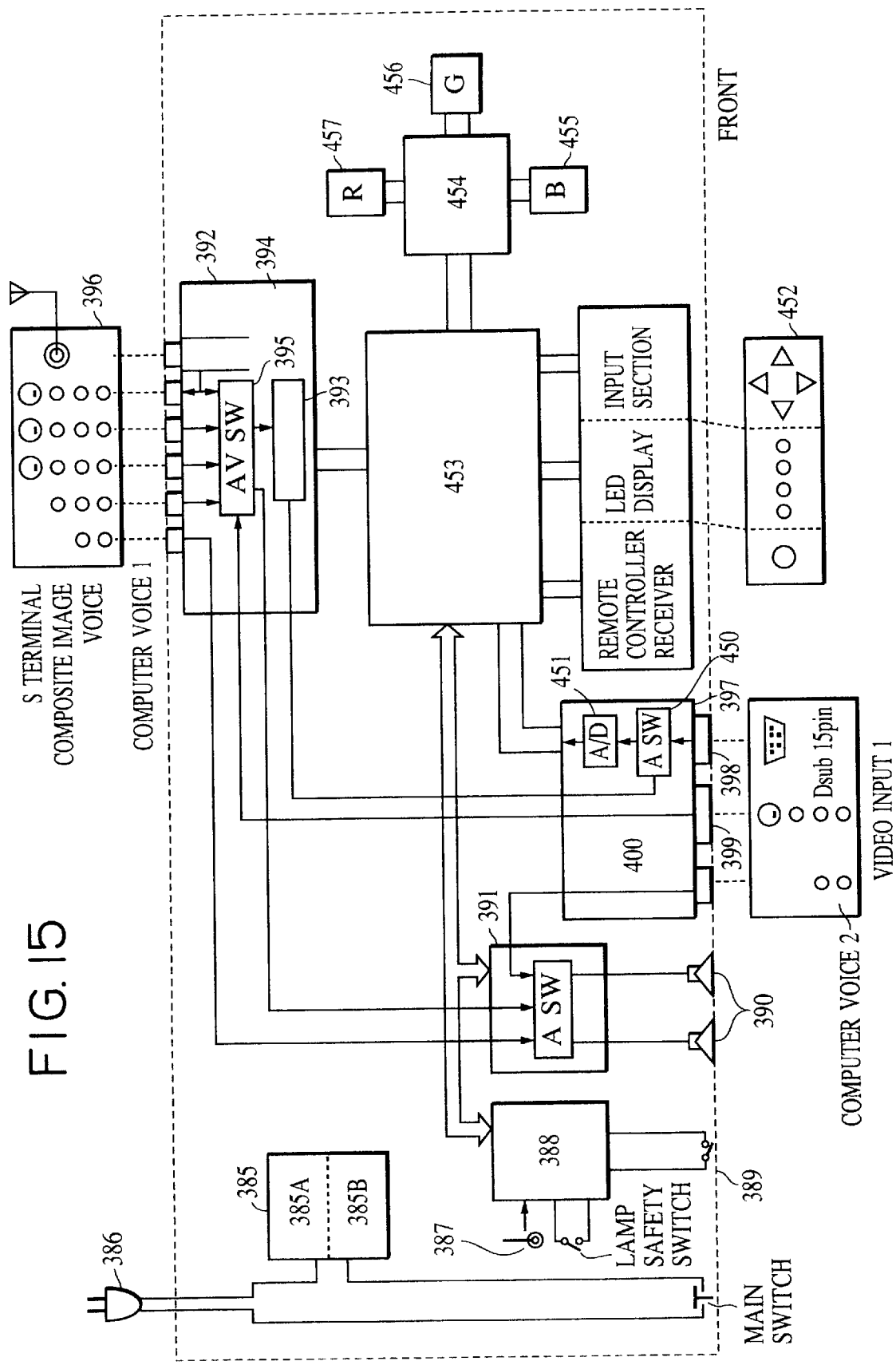
FIG. 15 is a circuit diagram of the interior of a liquid crystal projector in accordance with the present invention.

A peripheral electrical circuit of the liquid crystal panel will now be described with reference to FIG. 15. An electrical power source 385 includes a lamp power source 385B and a system power source 385A for driving the panel and a signal processing circuit. Electricity is supplied to the electrical power source 385 through a plug 386. A lamp temperature detector 387 detects the lamp temperature and submits the signals to a control board 388. The control board 388 turns the lamp switch off when the lamp temperature rises abnormally. The control board 388 also controls a filter safety switch 389. The filter safety switch 389 has the following function. When the lamp housing is at a high temperature, the box of the lamp housing is locked. In this embodiment, the circuit includes a speaker 390 and a voice board 391. The circuit may further include a 3D sound processor or a surround sound processor, if necessary. A first extended board 392 includes an S terminal for video signals, an input terminal from an external unit 396 for receiving composite images for video signals and voices, a selection switch 395 for selecting the signals, and a tuner 394. The first extended board 392 submits signals to a second extended board 400 through a decoder 393. The second extended board 400 receives signals from videos or computers through a D-sub fifteen pin terminal and a switch 450 and converts the signals into digital signals through an A/D converter 451. The switch 450 selects the signals from the decoder 393 or the D-sub fifteen pin terminal.

A main board 453 includes memories such as video RAMs and a CPU. The main board 453 stores digital NTSC signals from the AD converter 451, completes the signals, such that the number of the signals agrees with the number of the pixels in the liquid crystal display device, and processes various signals, such as γ-conversion edge gradation suitable for the liquid crystal display device and biasing for bright control. The main board 453 also converts resolution of VGA signals into that for a high resolution XGA panel. Further, the main board 453 combines NTSC signals for a plurality of images with computer signals. The output from the main board 453 is serial/parallel-converted into a form less affected by noise and submitted to a head board 454. The head board 454 serial/parallel-reconverts and D/A-converts the output, and divides the output according to the number of the video lines in the panel. The divided signals are submitted to three R, G and B liquid crystal panels 455, 456, and 457 through a drive amplifier. The screen is controlled through a remote controller panel 452. The R, G and, B liquid crystal panels 455, 456 and, 457 have their corresponding color filters and are driven by a general horizontal/vertical scanning means. An image not having high resolution can be converted into a high-resolution image in the liquid crystal display device, as described above.

In the seventh embodiment, individual segmental technologies described regarding various types of liquid crystal panels can be used in any combination. Liquid crystal panel configurations using a general transparent substrate other than the above-described semiconductor substrate are also effective in this embodiment. The technologies in this embodiment are also applicable to a transparent-type liquid crystal display device. The liquid crystal panel may be a diode-type in place of the MOSFET and TFT type in this embodiment. The liquid crystal panel in this embodiment can be used in display devices for home televisions, projectors, head mount displays, 3D image game machines, laptop computers, electronic notebooks, TV conference systems, car navigation systems, and airplane panels.

Eighth Embodiment

Figure 16A:
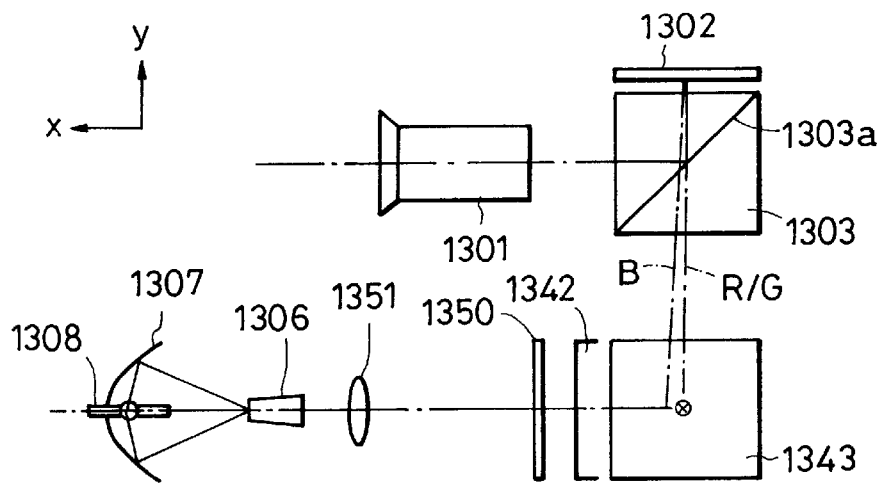
FIGS. 16A to 16C are block diagrams of an embodiment of an optical system in a projection-type liquid crystal display device in accordance with the present invention.
Figure 16B:
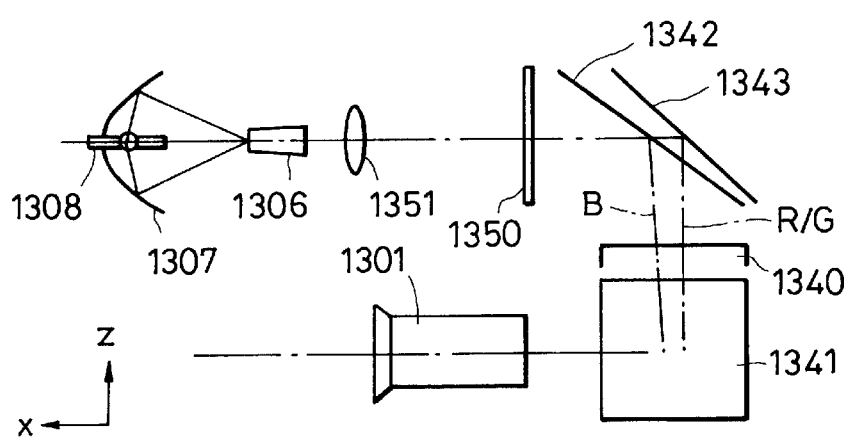
Figure 16C:
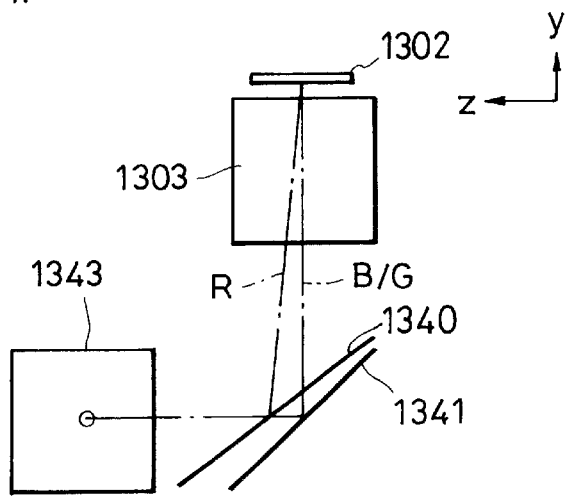
Figure 17A:
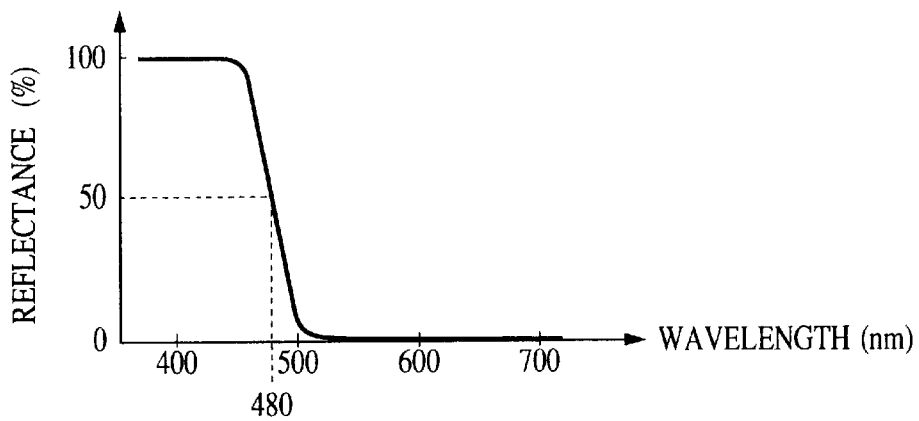
FIGS. 17A to 17C are graphs of spectral reflectance characteristics of dichroic mirrors used in an optical system of a projection-type liquid crystal display device in accordance with the present invention.
Figure 17B:
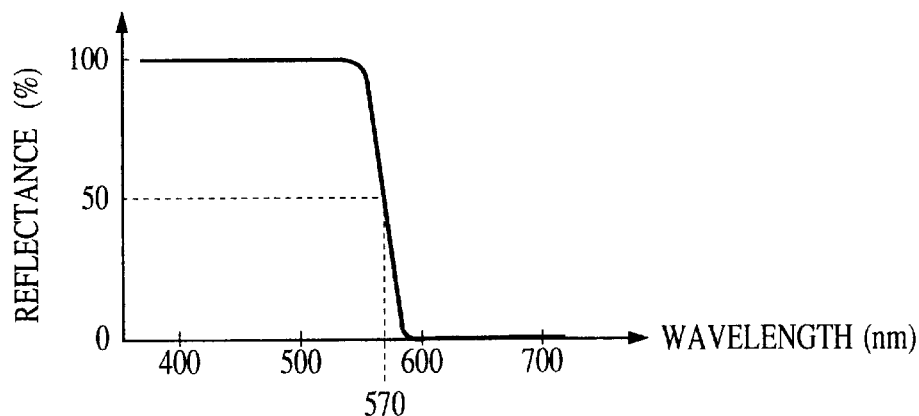
Figure 17C:
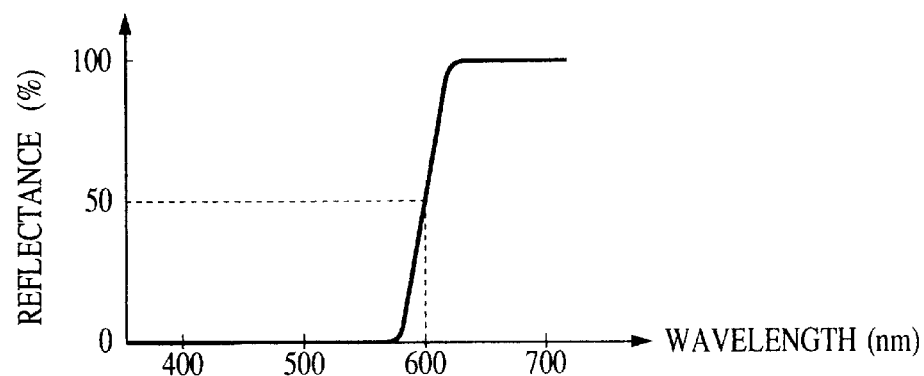
Figure 18:
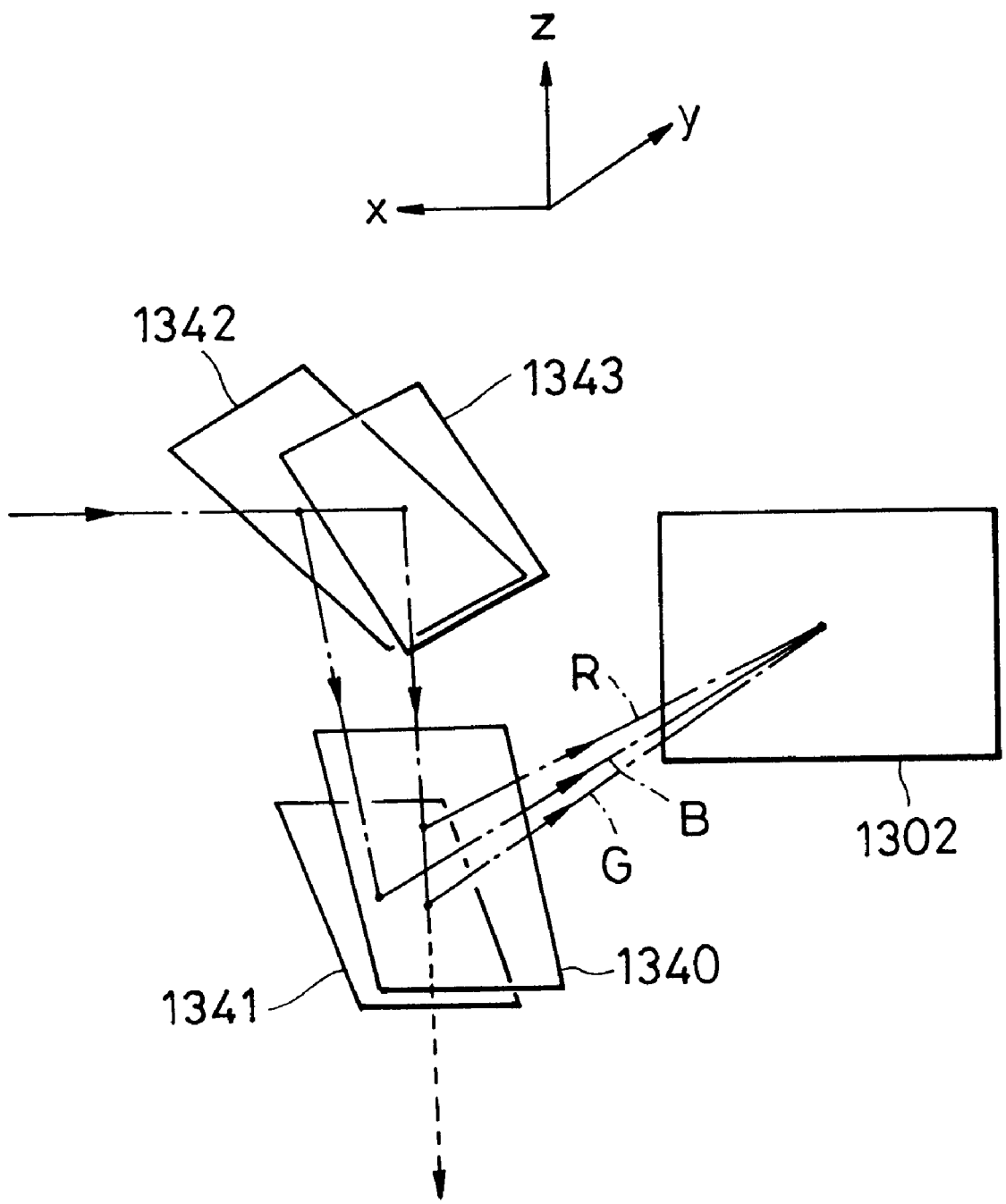
FIG. 18 is an isometric view of a color-separation/illumination section in an optical system of a projection-type liquid crystal display device in accordance with the present invention.

FIGS. 16A to 16C are block diagrams of an optical system for a front/rear projection-type liquid crystal display device in accordance with the present invention. FIGS. 16A, 16B and 16C are a top view, a front view, and a side view of the optical system, respectively. The optical system includes a projection lens 1301 for projecting images on a screen, a liquid crystal panel 1302 provided with a microlens, a polarizing beam splitter (PBS) 1303, an R reflecting dichroic mirror 1340, a B/G reflecting dichroic mirror 1341, a B reflecting dichroic mirror 1342, a high reflectance mirror 1343 for reflecting all the color light beams, a Fresnel lens 1350, a convex lens 1351, a rod integrator 1306, an oval reflector 1307, and an arc lamp 1308, such as a metal halide lamp or a UHP lamp. The B reflecting dichroic mirror 1342, the B/G reflecting dichroic mirror 1341, and the R reflecting dichroic mirror 1340 have spectral reflectance characteristics as shown in FIGS. 17A to 17C, respectively. These dichroic mirrors 1342, 1341 and 1340 and the high reflectance mirror 1343 are arranged as shown in an isometric view of FIG. 18. These mirrors decompose white light beams into R, G, and B color beams and the liquid crystal panel 1302 is illuminated with the R, G, and B color beams from different directions.

With reference to FIGS. 16A to 16C, the arc lamp 1308 as a light source emits white light beams, which are collected at the port of the integrator 1306. The light beams pass through while being repeatedly reflected in the interior of the integrator 1306. The spatial distribution of the intensity of the light beams becomes uniform in the integrator 1306. The light beams from the integrator 1306 are collimated in the X direction (based on the front view of FIG. 16B) by the convex lens 1351 and the Fresnel lens 1350 towards the B reflecting dichroic mirror 1342. The B reflecting dichroic mirror 1342 reflects blue light beams in the Z direction with a given angle towards the R reflecting dichroic mirror 1340, whereas the B reflecting dichroic mirror 1342 transmits R/G light beams. The R/G light beams are reflected in the Z direction by the high reflectance mirror 1343 towards the R reflecting dichroic mirror 1340. The B reflecting dichroic mirror 1342 and the high reflectance dichroic mirror 1343 are arranged so as to reflect downwardly, in the Z direction, the light beams from the integrator 1306 that has been travelling along the X direction. Thus, the high reflectance mirror 1343 has a tilt of 45° with respect to the XY plane with a Y rotation axis. The B reflecting dichroic mirror 1342 has a tilt of less than 45° with respect to the XY plane with a Y rotation axis. As a result, the R/G light beams are reflected by 90° in the Z direction by the high reflectance mirror 1343, whereas the B light beams are downwardly reflected in the Z direction with a given angle (tilted in the XZ plane). The shift distance and tilt angle between the high reflectance mirror 1343 and the B reflecting dichroic mirror 1342 are determined so that main light beams of three primary colors cross on the liquid crystal panel 1302. The B light beams and the R/G light beams thereby illuminate the same range on the liquid crystal panel 1302.

The R/G/B light beams in the Z direction travel towards the R reflecting dichroic mirror 1340 and the B/G reflecting dichroic mirror 1341. The R reflecting dichroic mirror 1340 and the B/G reflecting dichroic mirror 1341 lie under the B reflecting dichroic mirror 1342 and the high reflectance mirror 1343. The B/G reflecting mirror 1341 has a tilt of 45° with respect to the XZ plane with an X rotation axis. The R reflecting dichroic mirror 1340 has a tilt of less than 45° with respect to the XZ plane with a Z rotation axis. Thus, B/G light beams pass through the R reflecting dichroic mirror 1340, are reflected by 90° in the Y+ direction by the B/G reflecting dichroic mirror 1341, are polarized by the PBS 1303, and are incident on the liquid crystal panel 1302 which is horizontally arranged on the XZ plane. The B light beams having a given angle with respect to the X axis (tilted in the XZ plane) are reflected by the R/G reflecting dichroic mirror 1341 while maintaining the tilt angle with respect to the Y axis (tilted in the XY plane), and are incident on the liquid crystal panel 1302 with an incident angle (in the direction of the XY plane) corresponding the tilt angle.

The G light beams are reflected by 90° in the Y+ direction by the B/G reflecting dichroic mirror 1341, polarized by the PBS 1303 and incident on the liquid crystal panel 1302 with an incident angle of 0°, that is, in the vertical direction. The R light beams are reflected in the Y+ direction by the R reflecting dichroic mirror 1340, which is arranged in front of the B/G reflecting dichroic mirror 1341, so that the beams have a given angle (tilted in the YZ plane) as shown in FIG. 16C. The R light beams are then polarized by the PBS 1303 and are incident on the liquid crystal panel 1302 with an incident angle (in the YZ direction) corresponding to the tilt angle. The shift distance and tilt angle between the B/G reflecting dichroic mirror 1341 and the B reflecting dichroic mirror 1342 are determined so that main light beams of three primary colors cross on the liquid crystal panel 1302. The R, G and, B light beams thereby illuminate the same range on the liquid crystal panel 1302. With reference to FIGS. 17A to 17C, the B reflecting dichroic mirror 1342, the B/G reflecting dichroic mirror 1341 and the R reflecting dichroic mirror 1340 have a cut-off wavelength of 480 nm, 570 nm and 600 nm, respectively. As a result, the B/G reflecting dichroic mirror 1341 transmits unnecessary orange light beams. The color balance can thereby be optimized.

Figures 28, 29:
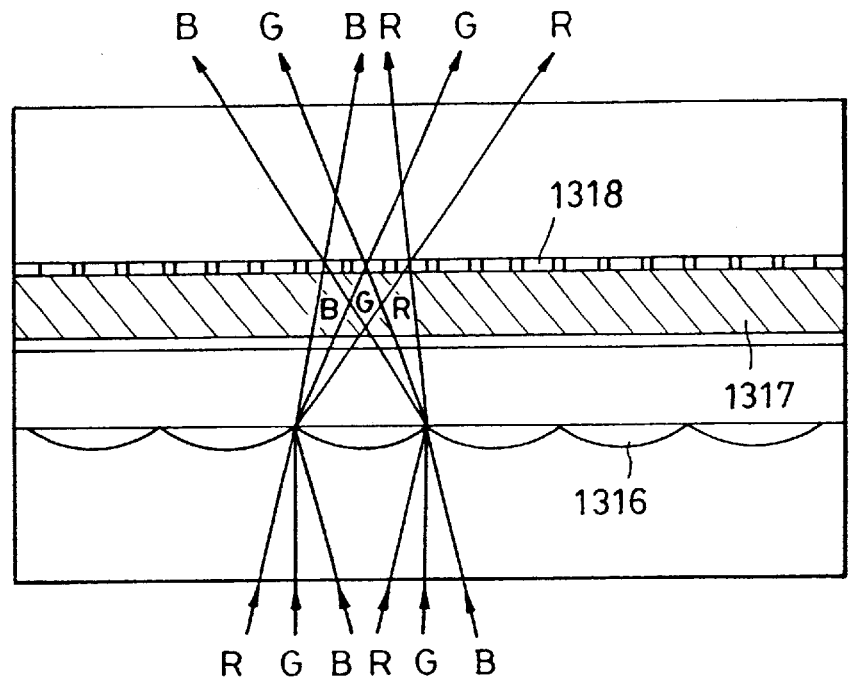
FIG. 28 is a partially enlarged cross-sectional view of a transmission liquid crystal panel provided with microlenses.
FIG. 29 is a partially enlarged view of an image projected on a screen in a projection-type liquid crystal display device using a transmission liquid crystal panel provided with microlenses.
Figure 30A:
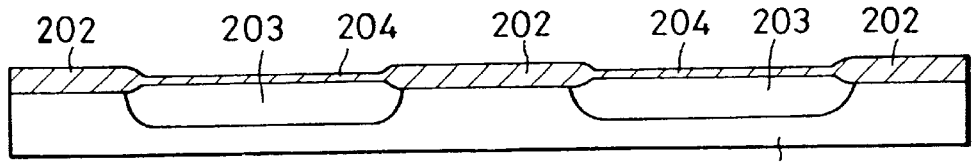
FIGS. 30A to 30H are cross-sectional views of production steps of a liquid crystal display device chip.
Figure 30B:
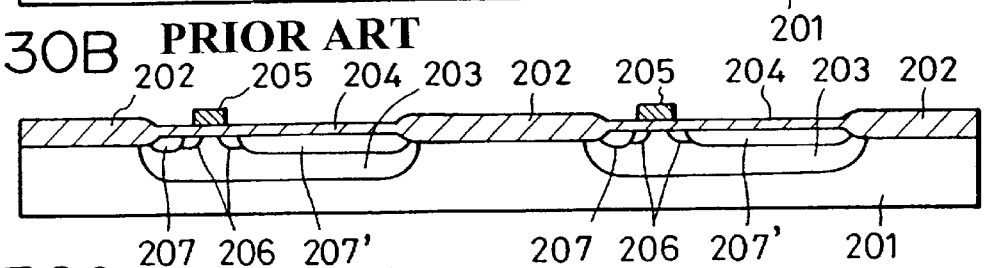
Figure 30C:
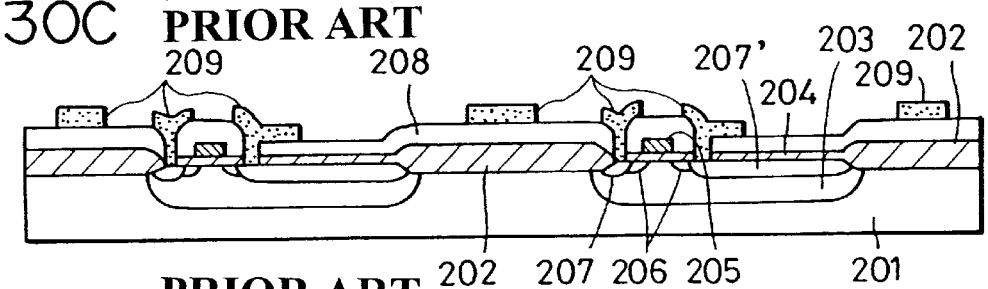
Figure 30D:
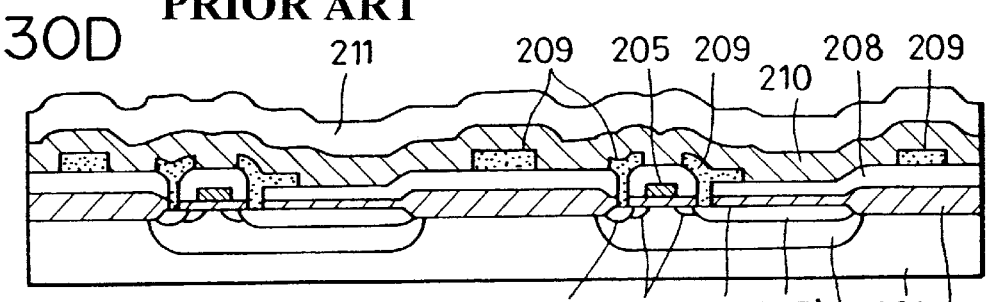
Figure 30E:
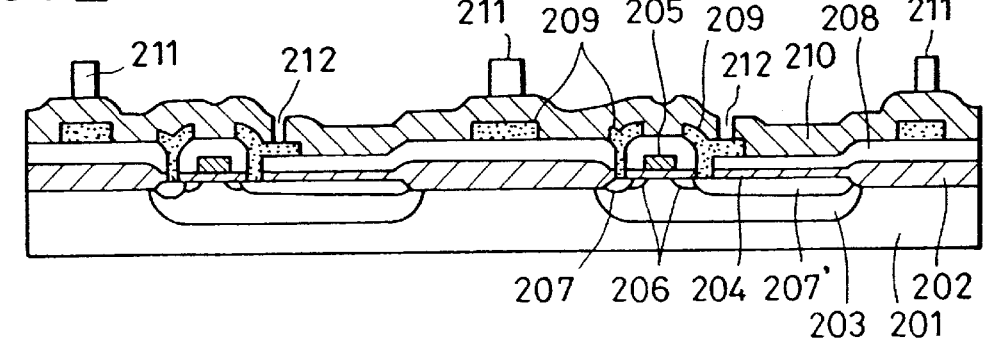
Figure 30F:
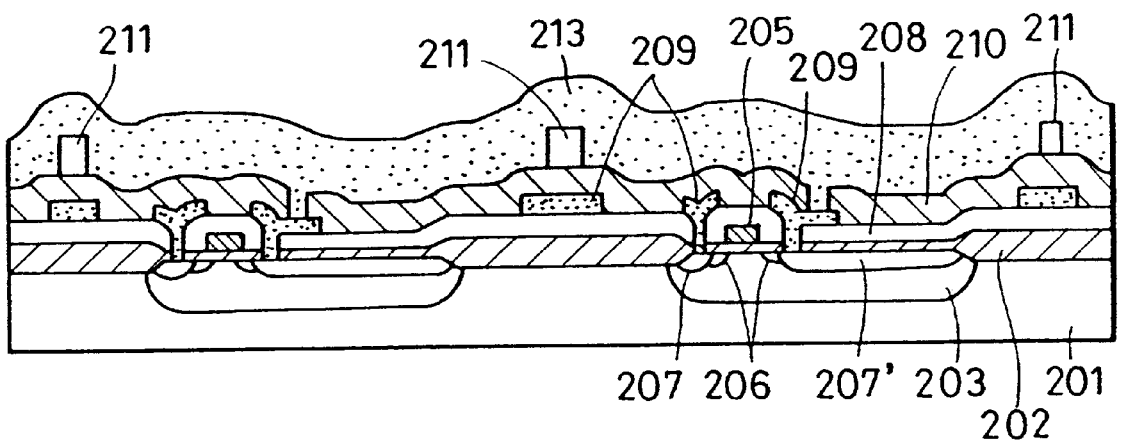
Figure 30G:
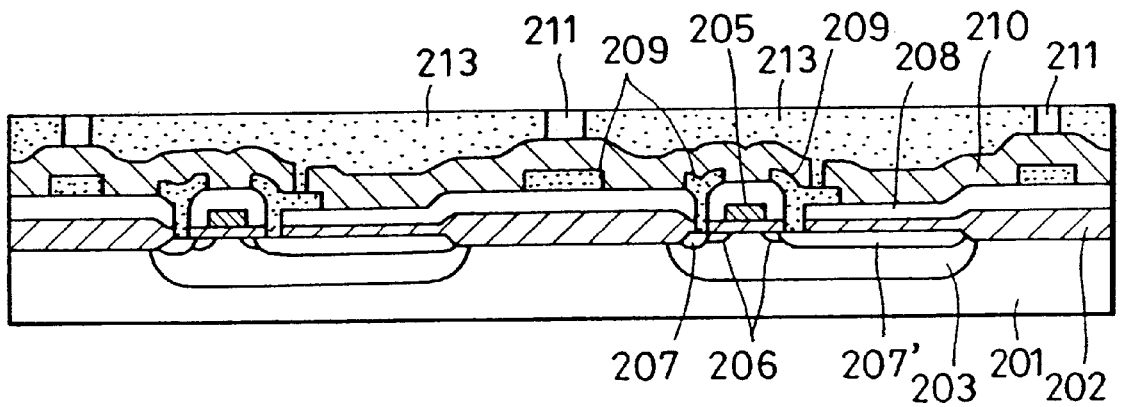
Figure 30H:
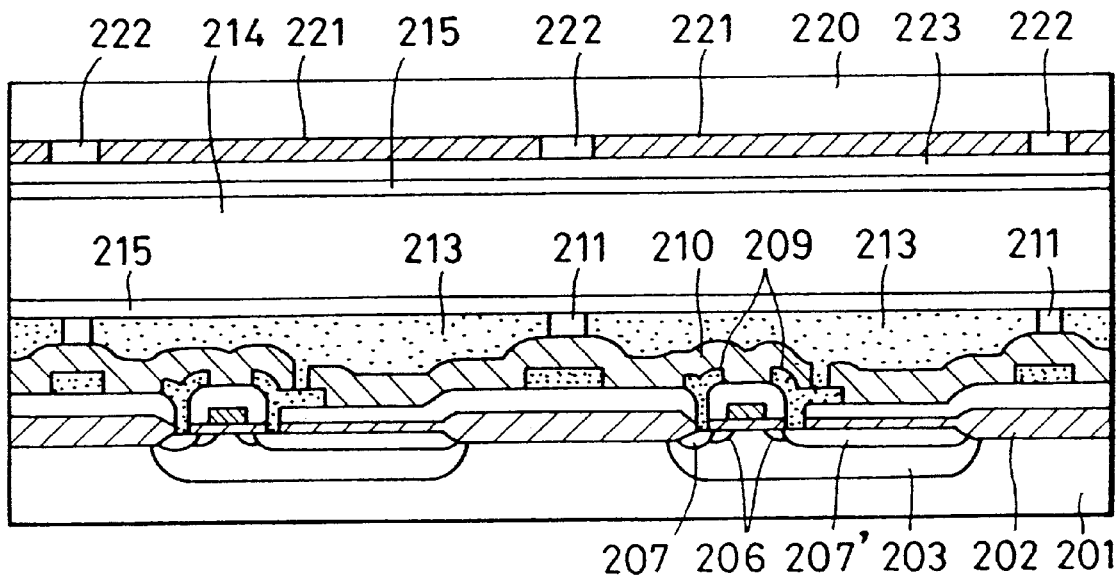

As will be described below, the R, G, and B light beams are reflected and polarized by the liquid crystal panel 1302, and are incident on the PBS 1303. Light beams which are reflected in the X+ direction by the PBS face 1303a in the PBS 1303 are enlarged by the projection lens 1301 and projected onto the screen (not shown in the drawings) as an image. The R, G, and B light beams enter the liquid crystal panel 1302 at different incident angles, and thus are emitted from the liquid crystal panel 1302 at different angles. Thus, the projection lens 1301 that is used has a large diameter and a large aperture. The divergence of light beams from the liquid crystal panel 1302 is relatively low in this embodiment, because the light beams are collimated by passing twice through the microlens. Thus, a bright image is projected through an inexpensive projection lens having a lower aperture. In contrast, the divergence of light beams in conventional transmittance-type liquid crystal panels is large because of collimating effects of the microlens, as shown in FIG. 28. Thus, in conventional panels, an expensive projection lens with a large aperture must be used. In the invention, a stripe-type display system as shown in FIG. 29 can be used; however, this system is not desirable for a liquid crystal panel having a microlens, as will be described below.

Figure 19:
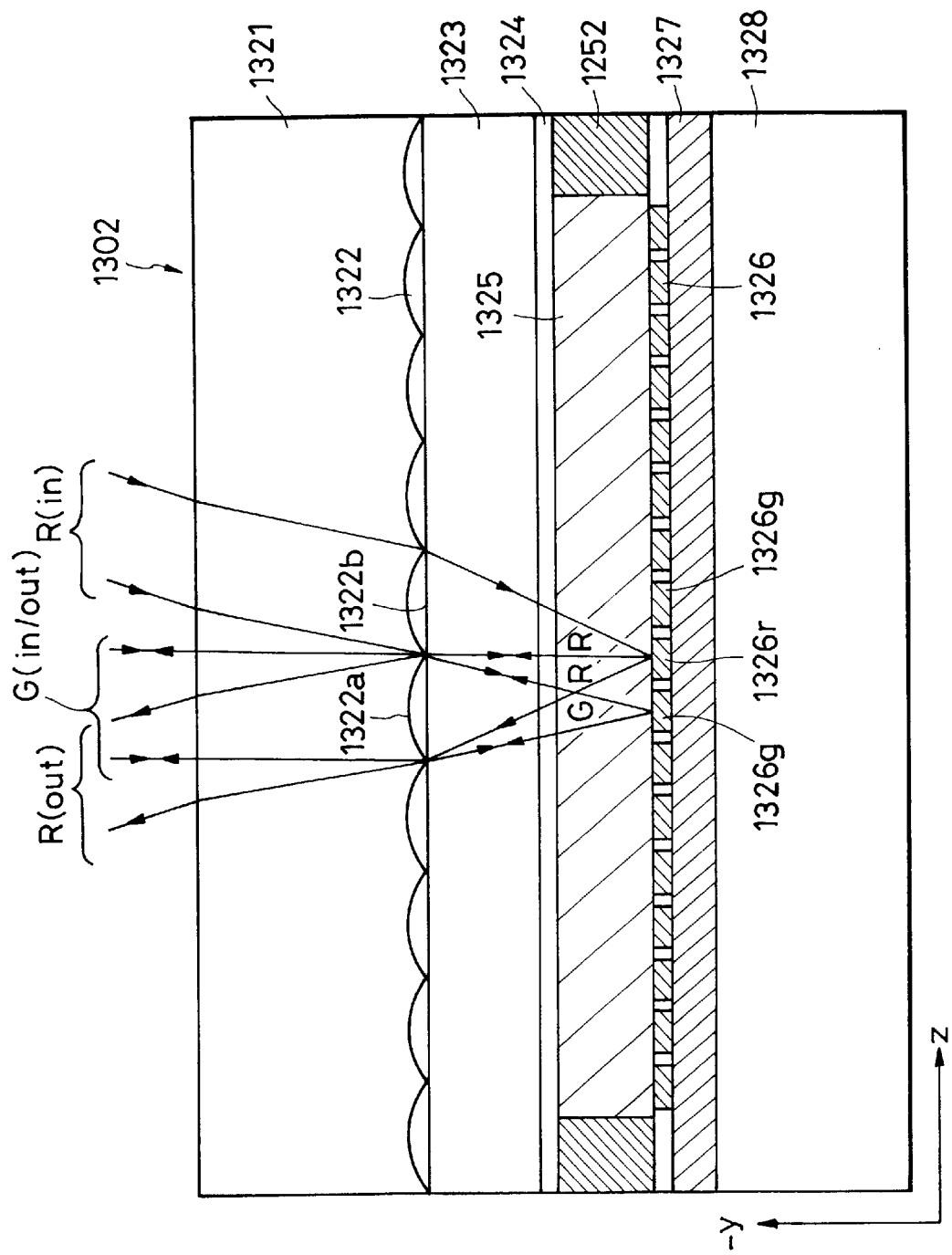
FIG. 19 is a cross-sectional view of an embodiment of a liquid crystal panel in accordance with the present invention.

The liquid crystal panel 1302 in this embodiment will now be described with reference to an enlarged cross-sectional view in FIG. 19. The cross-section corresponds to the YZ plane in FIG. 18. In FIG. 19, numeral 1321 represents a microlens substrate, numeral 1322 represents a microlens, numeral 1323 represents a glass sheet, numeral 1324 represents a transparent counter electrode, numeral 1325 represents a liquid crystal layer, numeral 1326 represents a pixel electrode, numeral 1327 represents an active matrix driving circuit section, numeral 1328 represents a silicon semiconductor substrate, and numeral 1252 represents a boundary section. The microlens 1322 is formed on the glass substrate 1321 composed of alkaline glass by an ion-exchange process, and has an orthogonal array structure with a pitch that is two times that of the pixel electrode 1326.

The liquid crystal layer 1325 contains an ECB-type nematic liquid crystal, such as DAP or HAN, which is suitable for a reflection-type liquid crystal display device. The liquid crystal is aligned by an alignment layer not shown in the drawing. Since the voltage used in this embodiment is lower than that used in the fourth embodiment, the potential to be applied to the pixel electrode 1326 must be set with a high degree of accuracy. The pixel electrode 1326 is composed of aluminum, and functions as a reflecting mirror. Thus, it is subjected to CMP treatment in the finishing step after patterning to polish the surface and to improve the reflectance, as will be described in detail below.

The active matrix driving circuit section 1327 is a semiconductor circuit provided on the silicon semiconductor substrate 1328, and drives the pixel electrode 1326 by an active matrix mode. A gate line driver, including a vertical register, and a signal line driver, including a horizontal register, not shown in the drawing, are provided at the peripheral section of the circuit matrix. RGB primary color signals are transmitted to corresponding RGB pixels by the peripheral driving and active matrix driving circuits. Each pixel electrode 1326 in the RGB pixel array does not have a color filter and is discriminated as one of the RGB pixels by the primary color image signal from the active matrix driving circuit.

For example, G light beams are polarized by the PBS 1303 and are incident on the liquid crystal panel 1302 in the vertical direction. Among the G light beams, beams which are incident on a microlens 1322a are indicated by arrows G(in/out) in FIG. 19. The G light beams are collected by the microlens 1322 to illuminate the G pixel electrode 1326g, and reflected by the G pixel electrode 1326g and emitted to the exterior of the panel through the microlens 1322a. When the G light beams reciprocally pass through the liquid crystal layer 1325, they are modulated by the operation of the liquid crystal which is caused by an electric field formed by a signal voltage applied to the pixel electrode 1326. The G light beams from the liquid crystal layer are incident on the PBS 1303.

The G light beams are reflected by the PBS face 1303a (in FIG. 16A) in response to the extent of modulation. Thus, the quantity of light that is incident on the projection lens varies with the extent of modulation. Each pixel can display gradations in such a manner. The R light beams, incident on the liquid crystal panel in the diagonal direction of the YZ cross-section, are polarized by the PBS 1303 (in FIG. 16C). For example, the R light beams incident on the microlens 1322b are referred to as arrows R(in). The R light beams are collected by the microlens 1322b to illuminate an R pixel electrode 1326r, which is located at the left side from the microlens 1322b. The R light beams (R(out)) are reflected by the pixel electrode 1326r and emitted to the exterior of the panel through a microlens 1322a lying at the left side (−Z direction) of the microlens 1322b.

The R polarized light beams are modulated in the liquid crystal layer by the operation of the liquid crystal in response to the image signal which is applied to the pixel electrode 1326r. The emitted R light beams pass through the PBS 1303, and are projected through the projection lens 1301 by the same process as that in the G light beams. In FIG. 19, the drawing is shown as if the G light beams and the R light beams partly overlap with and interfere with each other on the pixel electrodes 1326g and 1326r. This is because the thickness of the liquid crystal layer appears in FIG. 19 relatively larger than it actually is. Actually, the liquid crystal layer 1325 generally has a thickness of 1 to 5 μm, which is significantly less than the thickness of the glass sheet 1323, that is, 50 to 100 μm. Thus, such interference actually will not occur in the practical liquid crystal panel regardless of the pixel size.

Figure 20A:
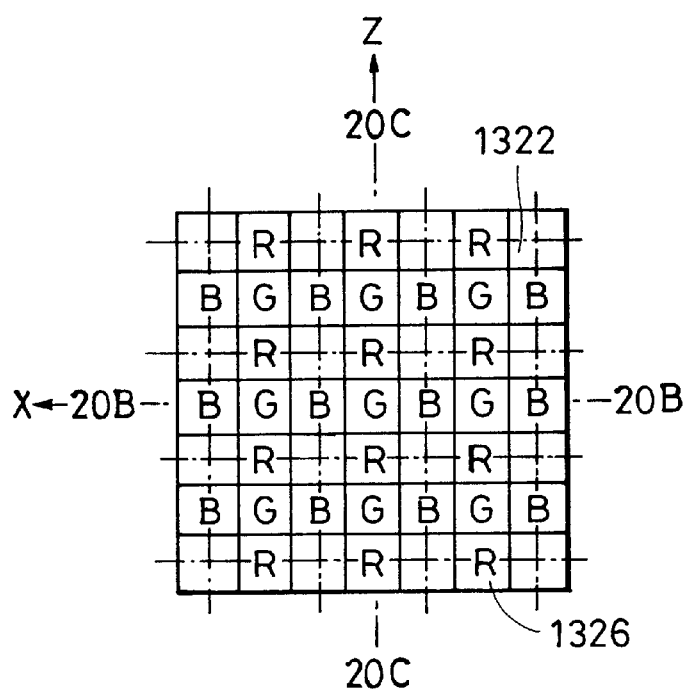
FIGS. 20A to 20C are schematic views illustrating the principle of color separation and color recombination in a liquid crystal panel in accordance with the present invention.
Figure 20C:
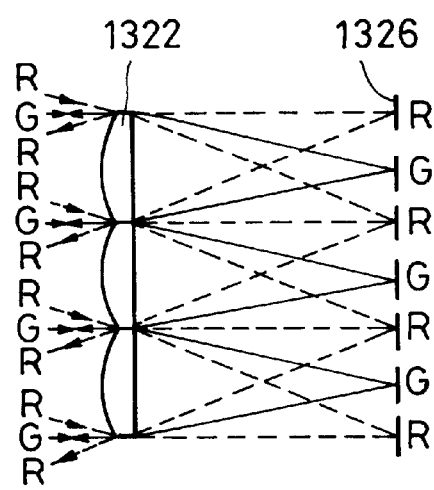
Figure 20B:
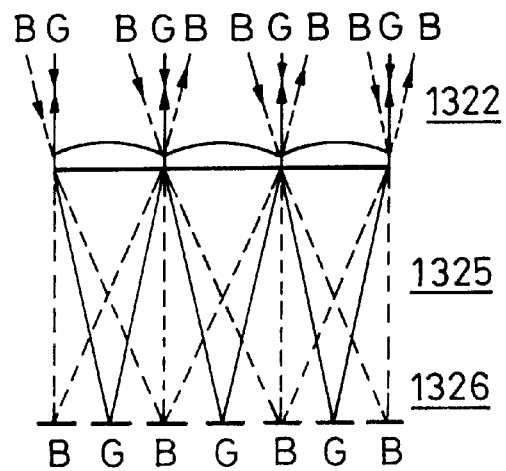

The color decomposition and recombination in this embodiment will now be described with reference to FIGS. 20A to 20C. FIGS. 20A, 20B, and 20C are a top view, an 20B—20B cross-sectional view (in the X direction) of the top view, and a 20C—20C cross-sectional view (in the Y direction) of the top view, respectively, of a schematic diagram of the liquid crystal panel 1302. Chain lines in FIG. 20A indicate boundaries of the microlens 1322. A region surrounded by the chain lines includes a central G pixel, halves of two adjacent R pixels and halves of two adjacent B pixels. FIG. 20C corresponds to FIG. 19 and shows R and G light beams which are incident on and emitted from the microlens 1322. As shown in the drawings, each G pixel electrode is arranged just under the center of a microlens element, whereas each R pixel electrode is arranged just under the boundary between two adjacent microlens elements. It is preferable that the incident angle (θ) of the R light beams be set such that tan θ is equal to the ratio of the pixel pitch (including a B pixel electrode and an R pixel electrode) to the distance between the microlens and the pixel electrode. FIG. 20B corresponds to the XY cross-section of the liquid crystal panel 1302. In the XY cross-section, B pixel electrodes and G pixel electrodes are alternately arranged. Each G pixel electrode is arranged just under the center of a microlens element, whereas each B pixel electrode is arranged just under the boundary between two adjacent microlens elements.

The B light beams, which are polarized by the PBS 1303, are incident on the liquid crystal panel in the diagonal direction of the XY cross-section. The B light beams from a microlens element are reflected by a B pixel electrode 1326B and emmited from the next microlens element in the X direction. The B light beams are also modulated by the liquid crystal and projected through the projection lens, as in the G and R light beams.

Each B pixel electrode is arranged just under the boundary between two adjacent microlens elements. It is preferable that the incident angle (θ) of the B light beams be set such that tan θ is equal to the ratio of the pixel pitch (including a B pixel electrode and a G pixel electrode) to the distance between the microlens and the pixel electrode. The liquid crystal panel in this embodiment has an RGB pixel array as shown in FIG. 20A, that is, arrangement RGRGRG . . . in the Z direction and arrangement BGBGBG . . . in the X direction. The size of each pixel is half the size of each microlens element, and thus the pitch between pixels is half that between microlens elements. FIG. 20A also shows that each G pixel lies just under the center of a microlens element, each R pixel lies just under a boundary of two adjacent microlens elements in the Z direction, and each B pixel lies just under aboundary of two adjacent microlens elements in the X direction. Each microlens element has a square shape in plan view and an area which is two times that of a pixel.

Figure 21:
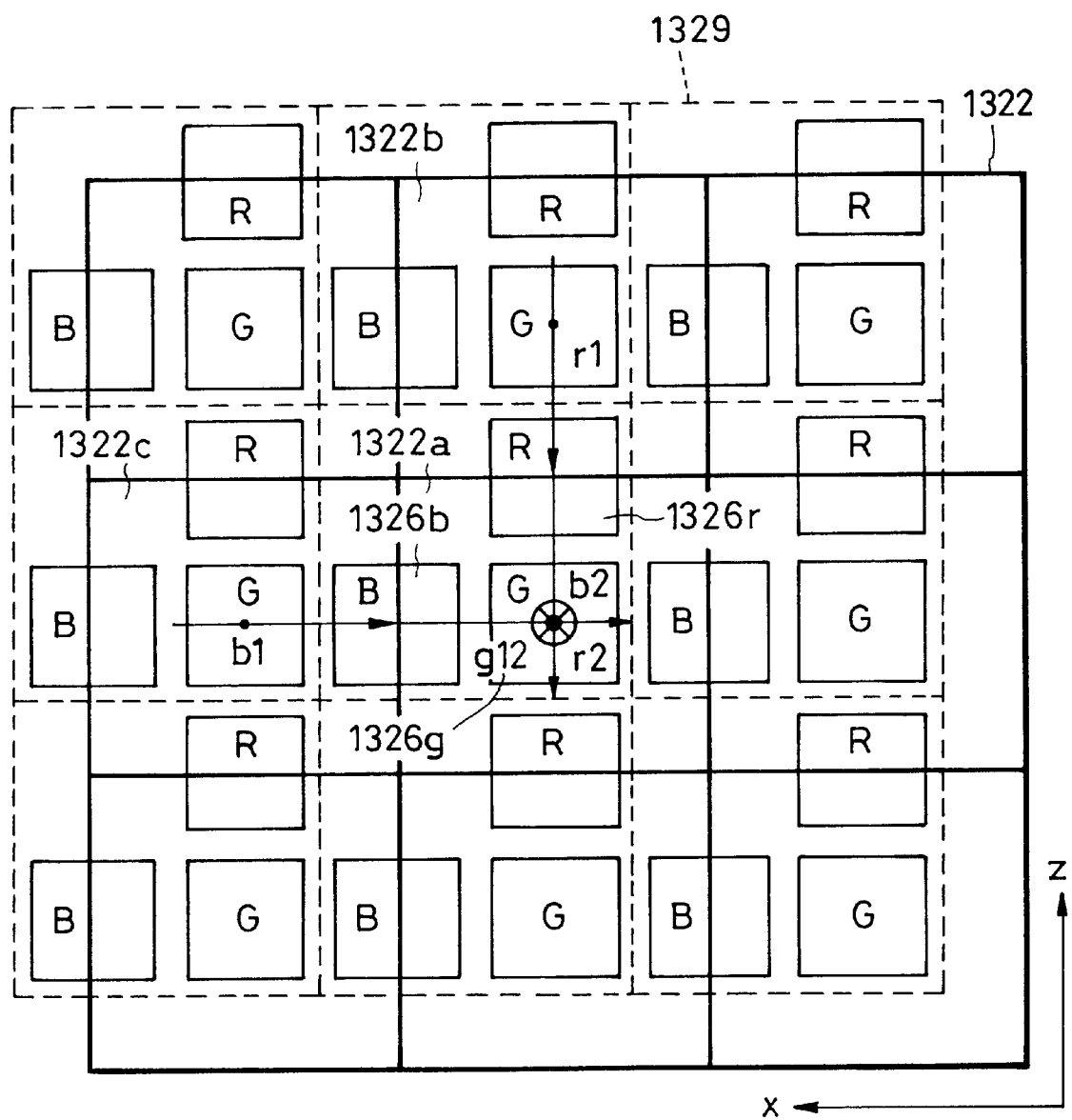
FIG. 21 is an enlarged top view of a liquid crystal panel of an embodiment in accordance with the present invention.

FIG. 21 is an enlarged partial plan view of the liquid crystal panel, in which each grid 1329 surrounded with broken lines indicates an RGB pixel unit. The RGB pixels in the RGB pixel unit 1329 are driven in response to the corresponding RGB image signals from the active matrix driving circuit section 1327. With reference to an RGB pixel unit including an R pixel electrode 1326r, a G pixel electrode 1326g and a B pixel electrode 1326b, R light beams from the microlens element 1322b are diagonally incident on the R pixel electrode 1326r as shown by the arrow r1, and the reflected light beams are emitted through the microlens element 1322a as shown by the arrow r2. B light beams from the microlens element 1322c are diagonally incident on the B pixel electrode 1326b as shown by the arrow b1, and the reflected light beams are emitted through the microlens element 1322a as shown by the arrow b2. Further, G light beams from the microlens element 1322a are vertically incident on the G pixel electrode 1326g as shown by the arrow g12 illustrated as going into the paper (the Y direction) by the symbol ⊗, and the reflected light beams are emitted through the microlens element 1332a as shown by the arrow g12 in the opposite direction.

As described above, the RGB light beams are incident on an RGB pixel unit through different microlens elements 1322a, 1322b and 1322c and emitted through the same microlens element 1322a. Such a relationship holds for all RGB pixel units.

Figure 22:
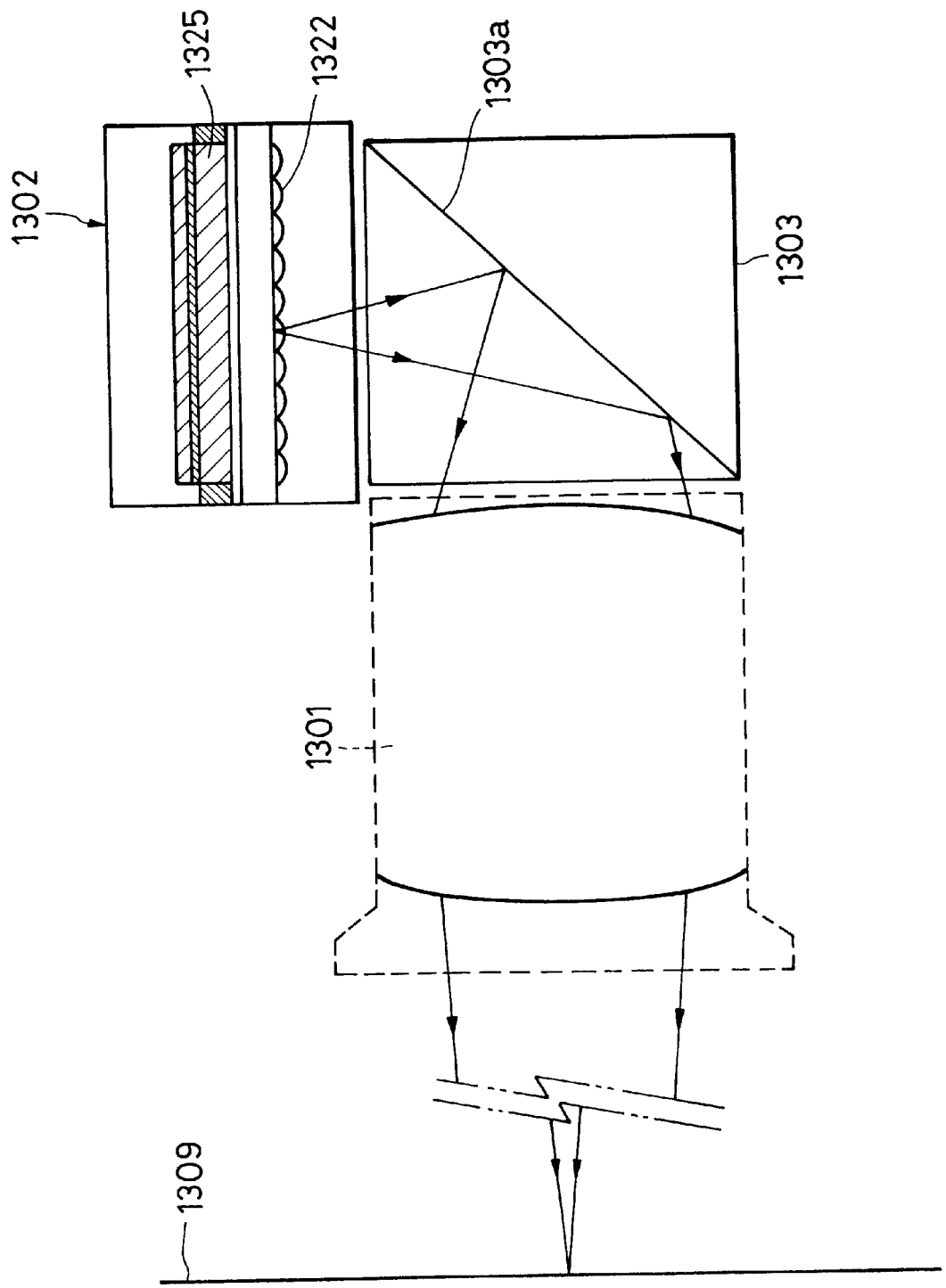
FIG. 22 is a partial block diagram of a projection optical system in a projection-type liquid crystal display device in accordance with the present invention.

As shown in FIG. 22, all of the emitted light beams are projected onto the screen 1309 through the PBS 1303 and the projection lens 1301. The optical system is aligned such that an image at the position of the microlens of the liquid crystal panel 1302 is formed on the projection lens 1301. Thus, the projected image consists of recombined color units, and each recombined color unit consists of RGB light beams from the same RGB pixel unit. Because the resulting color image does not have an RGB mosaic pattern, such as the pattern shown in FIG. 29, high image quality can be achieved.

In the cross-sectional view of FIG. 19, the active matrix driving circuit section 1327 lies under the pixel electrodes and RGB pixels are depicted in a row. The drain of each pixel FET is connected to each of RGB pixel electrodes 1326 arranged as shown in FIG. 9.

Figure 23:
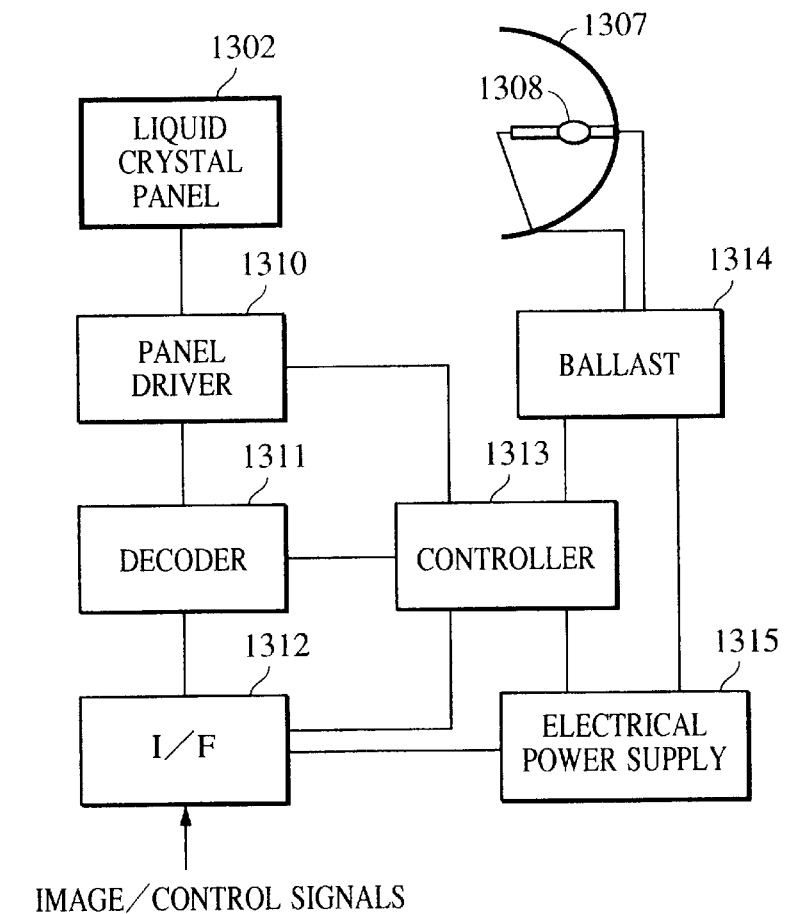
FIG. 23 is a block diagram of a driving circuit system in a projection-type liquid crystal display device in accordance with the present invention.
Figure 24:
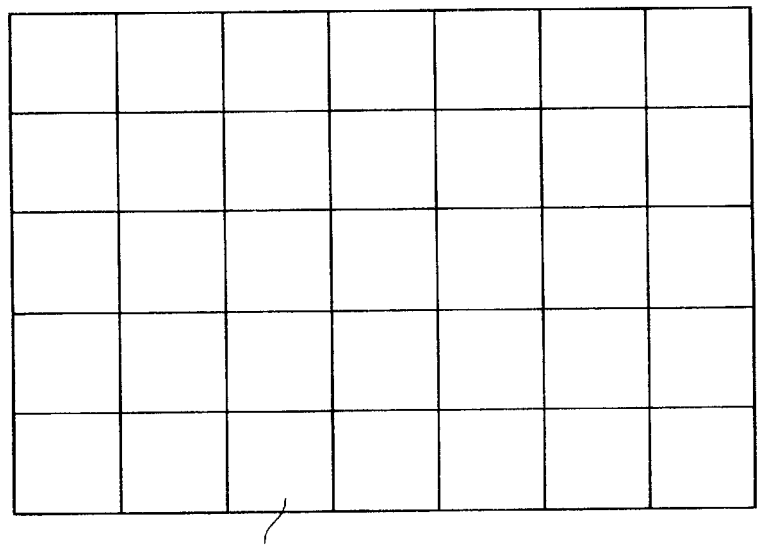
FIG. 24 is a partially enlarged view of an image projected on a screen in a projection-type liquid crystal display device in accordance with the present invention.

FIG. 23 is a block diagram of a driving circuit of the projection-type liquid crystal display device. A panel driver 1310 inverts the polarity of RGB image signals, and forms amplified liquid crystal driving signals, driving signals for the counter electrode 1324 and various timing signals. An interface 1312 decodes various image signals and control signals to form standard image signals. A decoder 1311 converts the standard image signals from the interface 1312 into RGB primary color image signals and synchronizing signals, that is, image signals for the liquid crystal panel 1302. A ballast 1314 drives an arc lamp 1308 in a parabolic reflector 1307. An electrical power supply circuit 1315 supplies electricity to each circuit block. A controller 1313 includes an operational section not shown in the drawing and intensively controls each circuit block.

Figure 25:
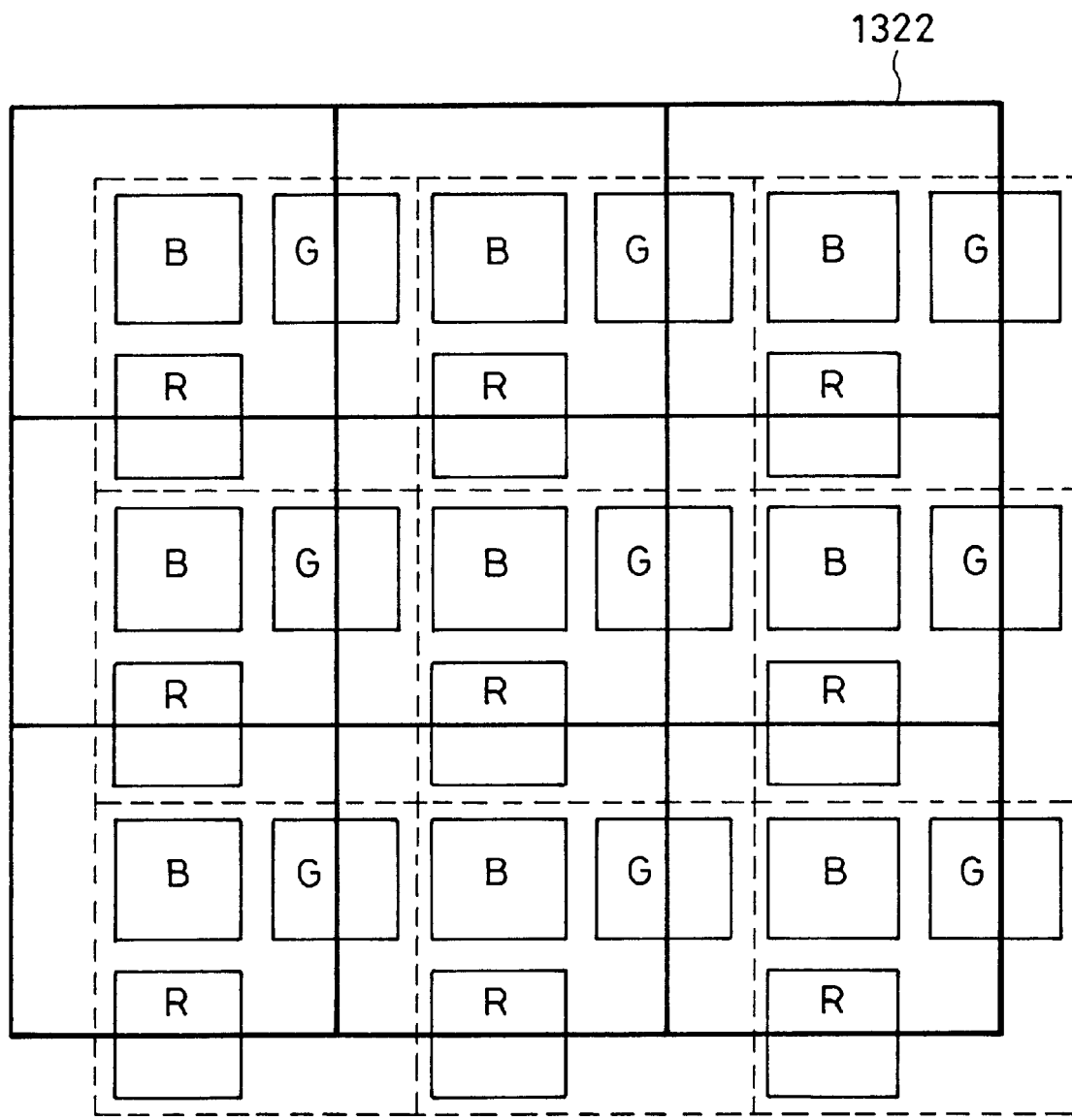
FIG. 25 is a partially enlarged top view of a liquid crystal panel of an embodiment in accordance with the present invention.

FIG. 25 is an enlarged partial cross-sectional view of another embodiment of the liquid crystal panel. In this embodiment, a microlens element is provided for three pixel electrodes. Each B pixel electrode is arranged just under the center of each microlens element 1322. B pixels and G pixels are alternately arranged in the horizontal direction, and B pixels and R pixels are alternately arranged in the vertical direction. When vertical B light beams, and diagonal R/G light beams are incident on the corresponding RGB pixels as described above, the reflected light beams are emitted through the same microlens element. Alternatively, each R pixel may be arranged just under the center of each microlens element 1322, and G and B pixels may be arranged such that G and B pixels are alternately arranged in terms of R pixels in the horizontal and vertical directions.

Ninth Embodiment

Figure 26:
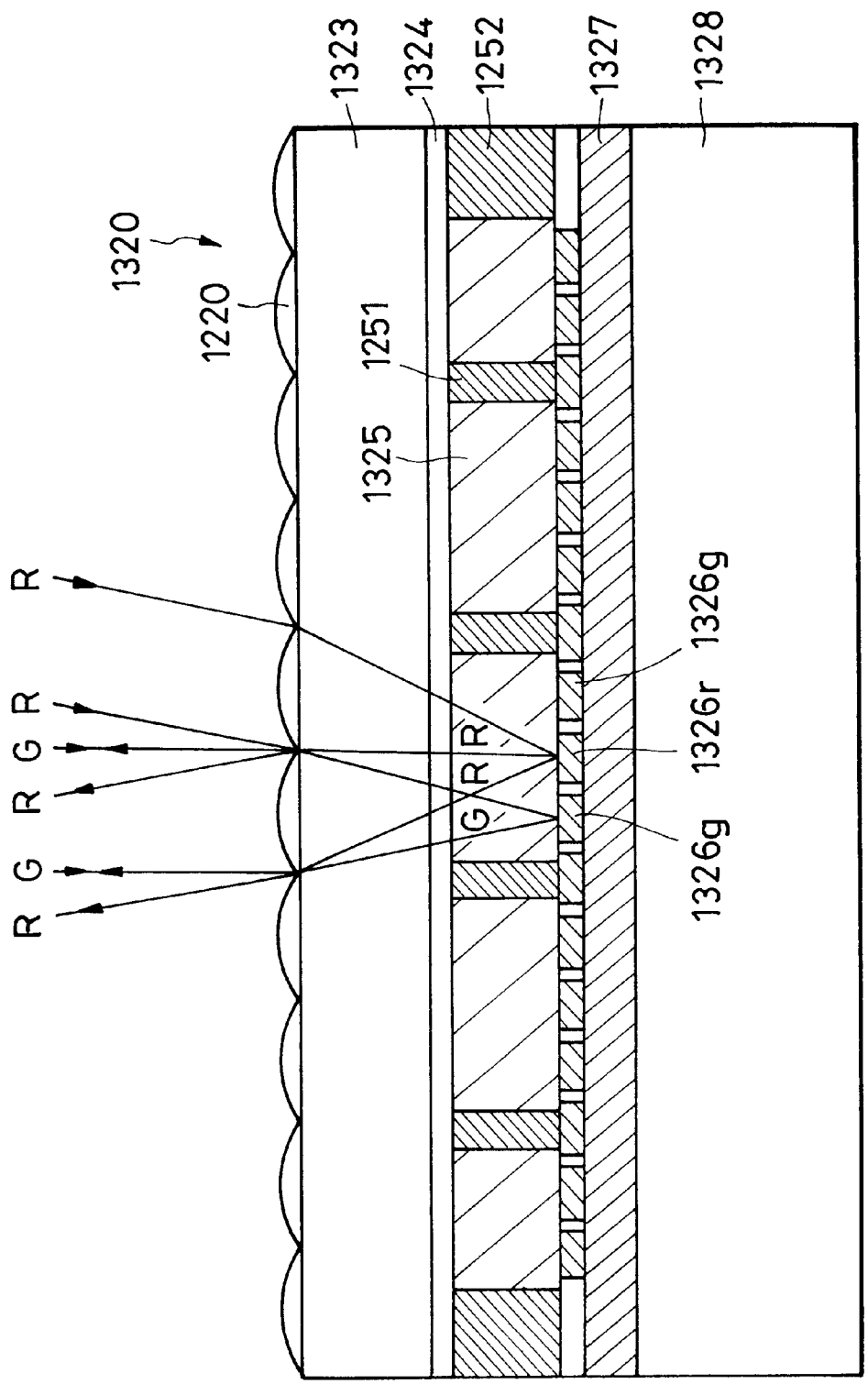
FIG. 26 is a partially enlarged cross-sectional view of a liquid crystal panel of an embodiment in accordance with the present invention.
Figure 27A:
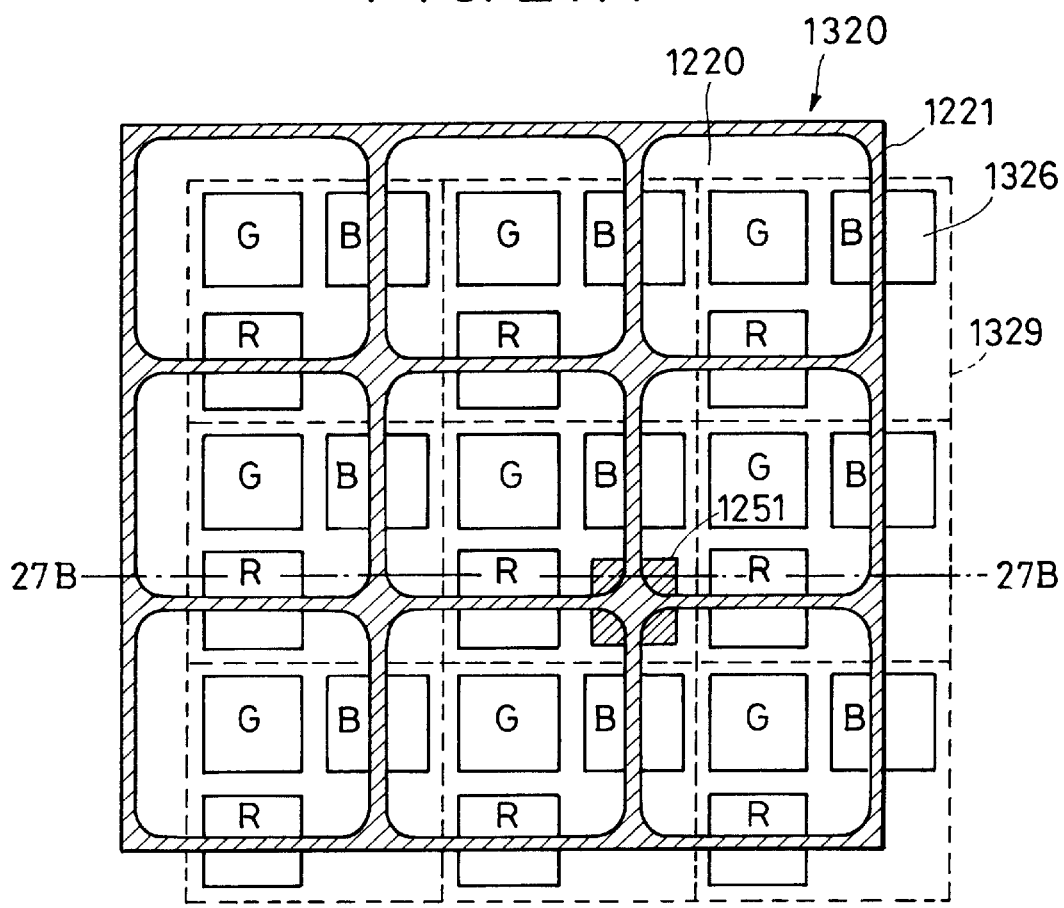
FIGS. 27A and 27B are a partially enlarged top view and a partially enlarged cross-sectional view of a liquid crystal panel of an embodiment in accordance with the present invention.
Figure 27B:
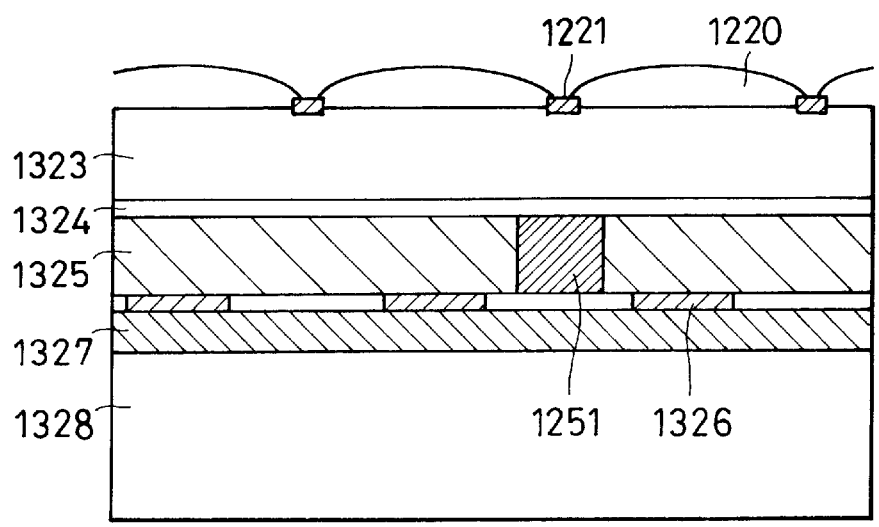

FIG. 26 is an enlarged partial cross-sectional view of a liquid crystal panel of a ninth embodiment in accordance with the present invention. In comparison with the eighth embodiment, a counter electrode 1323 is composed of a glass sheet, a microlens 1220 is composed of a thermoplastic resin and is formed on the counter electrode 1323 by a reflow process. Spacer columns 1251 at non-pixel sections are formed of a photosensitive resin by a photolithographic process. FIG. 27A is a partial top view of the liquid crystal panel 1320. As shown in FIG. 27A, spacer columns 1251 with a given pitch are formed in the non-pixel regions at the corner sections of microlens elements 1220. FIG. 27B is a cross-sectional view taken along the 27B—27B cross-section of FIG. 27A. It is preferred that the spacer columns 1251 be arranged with a pixel pitch of 10 to 100 in a matrix, for compatibility with the flatness of the glass sheet 1323 and injection of the liquid crystal. A shading layer 1221 of a patterned metallic film is provided in this embodiment to prevent invasion of leaking light beams from the boundary section of microlens elements. Thus, brightness and contrast of the projected image are further improved.

In the first to sixth embodiments, the shading layer on the sealing section of the liquid crystal pixels may be electrically separated from the shading layer in the display region or the potential of the shading layer on the sealing section may be set in a floating state. Such a modification will further improve the image quality of the liquid crystal display device in accordance with the present invention.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A liquid crystal display device comprising: a matrix substrate comprising a plurality of pixel electrodes arranged in a matrix and a driving circuit region, a sealing region comprising a sealant and a spacer material provided in the peripheral region of the plurality of pixel electrodes, a counter substrate, and a liquid crystal material disposed between the matrix substrate and the counter substrate, wherein said matrix substrate is provided with a first conductive layer under the plurality of pixel electrodes and a second conductive layer contacting the sealant in the sealing region, and the first conductive layer is electrically separated from the second conductive layer.

2. A liquid crystal display device according to claim 1, wherein a potential is applied to the first and second conductive layers.

3. A liquid crystal display device according to claim 1, wherein the first and second conductive layers function as shading layers.

4. A liquid crystal display device according to claim 1, wherein the second conductive layer under the sealing region is in a floating state.

5. A liquid crystal display device according to claim 1, wherein said matrix substrate is formed of a first conductive-type semiconductor substrate and a second conductive-type region is formed under the sealing region.

6. A liquid crystal display device according to claim 1, wherein a metallic layer of the same layer as the pixel electrode covers the gap between the first conductive layer and the second conductive layer or between the second conductive layer and a conductive layer provided under the driving circuit region.

7. A liquid crystal display device according to claim 1, wherein a glass sheet is arranged on the counter substrate.

8. A liquid crystal display device according to claim 7, wherein a microlens group comprising plural elements is arranged on the counter substrate.

9. A liquid crystal display device according to claim 8, wherein each element of the microlens group is arranged in correspondence to three of the plurality of pixel electrodes.

10. A projection-type liquid crystal display device for projecting an image comprising a liquid crystal display device according to claim 1 and an optical system.

11. A projection-type liquid crystal display device according to claim 10, wherein an image formed by said liquid crystal display device is projected by separating a blue light component using a high-reflectance mirror and a blue-light reflecting dichroic mirror and by separating a red light component from a green light component using a red-light reflecting dichroic mirror and a green/blue-light reflecting dichroic mirror.

* * * * *

UNITED STATES PATENT AND TRADEMARK OFFICE
CERTIFICATE OF CORRECTION

PATENT NO.   : 6,476,897 B1
DATED        : November 5, 2002
INVENTOR(S)  : Takanori Watanabe et al.

It is certified that error appears in the above-identified patent and that said Letters Patent is hereby corrected as shown below:

<u>Column 9,</u>
Line 7, "therebetween." should read -- therebetween. ¶ These advantages in the embodiment are more effective in, for example, a liquid crystal projector using strong light beams. --.

Signed and Sealed this

Ninth Day of September, 2003

JAMES E. ROGAN
*Director of the United States Patent and Trademark Office*